United States Patent [19]
Burchard et al.

[11] Patent Number: 5,858,215
[45] Date of Patent: *Jan. 12, 1999

[54] WATER FILTER CONTAINING FAUCET AND DISPLAY THEREFOR

[75] Inventors: Thomas H. Burchard, Winchester; Gregory Hunter, Westwood; Kevin M. Johnson, Natick, all of Mass.; John Lofgren, Glendale; Henry N. Wagner, Cedar Grove, both of Wis.; Lee A. Mercer, Valley City, Ohio

[73] Assignee: Moen Incorporated, North Olmsted, Ohio

[ * ] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,823,229.

[21] Appl. No.: 761,351

[22] Filed: Dec. 6, 1996

[51] Int. Cl.$^6$ .......................... B01D 17/12; B01D 35/143
[52] U.S. Cl. .......................... 210/87; 137/551; 137/801; 210/91; 210/94; 210/433.1; 210/449
[58] Field of Search .................. 210/85, 87–89, 210/91, 94, 138, 282, 143, 420, 424, 433.1, 434, 449, 460; 73/861.78, 861.79; 137/551, 552, 553, 554, 555, 559, 560, 801

[56] References Cited

U.S. PATENT DOCUMENTS

| | | |
|---|---|---|
| 712,868 | 11/1902 | Traxton . |
| 738,486 | 9/1903 | Rogers . |
| 816,517 | 3/1906 | Whalen . |
| 1,835,865 | 12/1931 | Hansen . |
| 2,334,791 | 11/1943 | Roffy . |
| 3,743,188 | 7/1973 | Wagner . |
| 4,107,046 | 8/1978 | Corder . |
| 4,242,201 | 12/1980 | Stephens et al. . |
| 4,623,451 | 11/1986 | Oliver ...................................... 210/87 |
| 4,863,103 | 9/1989 | Gannaway . |
| 4,918,426 | 4/1990 | Butts et al. .............................. 210/89 |
| 4,982,900 | 1/1991 | Blake . |
| 5,008,011 | 4/1991 | Underwood . |
| 5,089,144 | 2/1992 | Ozkahyaoglu et al. .................. 210/87 |
| 5,128,034 | 7/1992 | Kool ....................................... 210/282 |
| 5,131,277 | 7/1992 | Birdsong et al. ........................ 210/87 |
| 5,152,464 | 10/1992 | Farley . |
| 5,171,429 | 12/1992 | Yasuo . |
| 5,192,424 | 3/1993 | Beyne et al. .............................. 210/91 |
| 5,236,578 | 8/1993 | Oleskow et al. .......................... 210/87 |
| 5,328,597 | 7/1994 | Boldt et al. ............................. 210/282 |
| 5,370,314 | 12/1994 | Gebauer et al. . |
| 5,385,667 | 1/1995 | Steger . |
| 5,540,107 | 7/1996 | Silverman et al. .................. 73/861.78 |
| 5,628,895 | 5/1997 | Zucholl ..................................... 210/91 |

*Primary Examiner*—Joseph W. Drodge
*Attorney, Agent, or Firm*—Dorn, McEachran, Jambor & Keating

[57] ABSTRACT

The combination of a water filter and a display for indication of the water filter condition includes an electrical circuit connected to the display and responsive to use of the water filter. The circuit includes a microcontroller, a timer connected to the microcontroller and providing timing signals thereto, and a switch connected to the microcontroller and responsive to the flow of water from the filter to cause the microcontroller to process the timing signals. The microcontroller is programmed to utilize the timing signals to provide an electrical signal to the display indicative of filter condition.

13 Claims, 17 Drawing Sheets

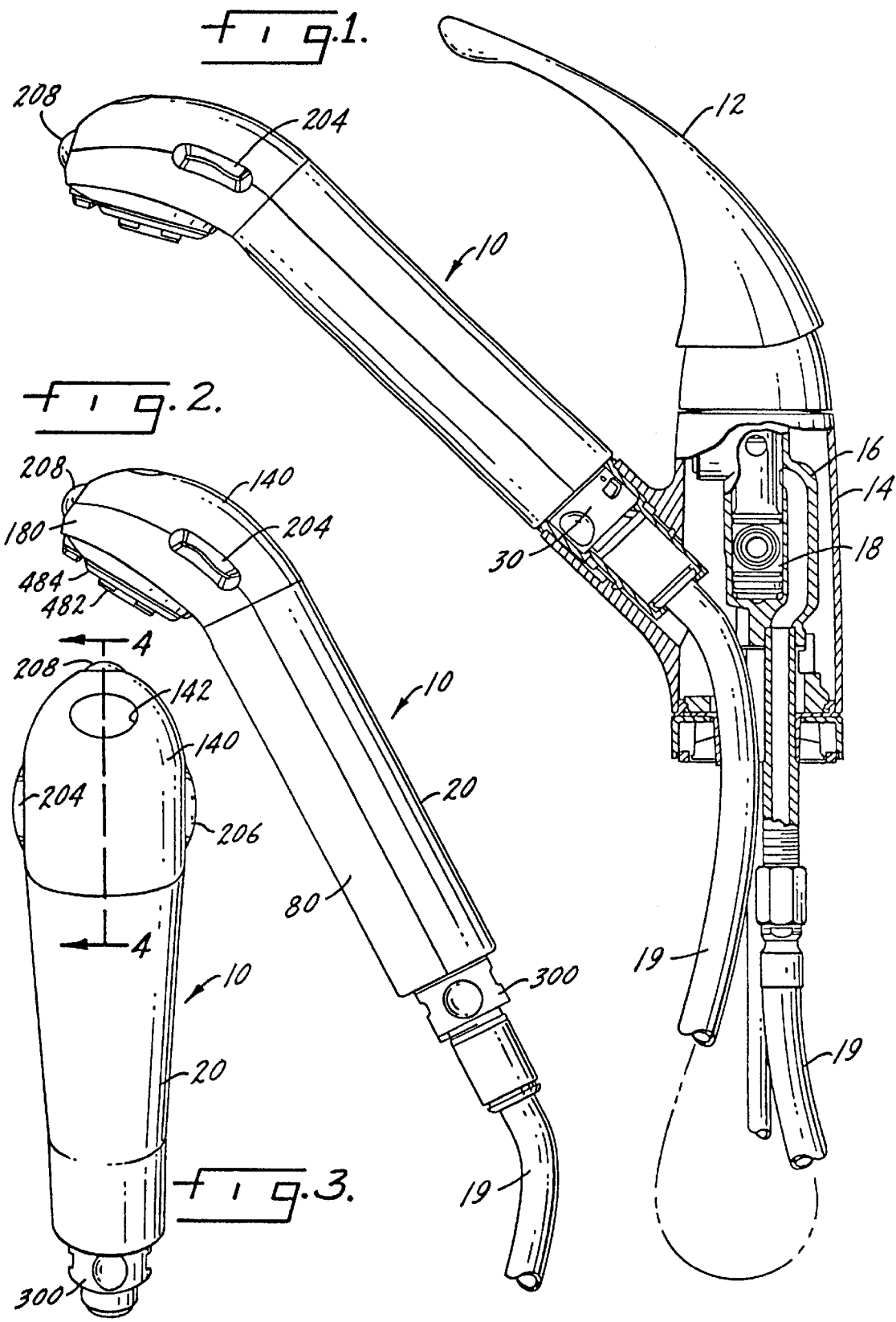

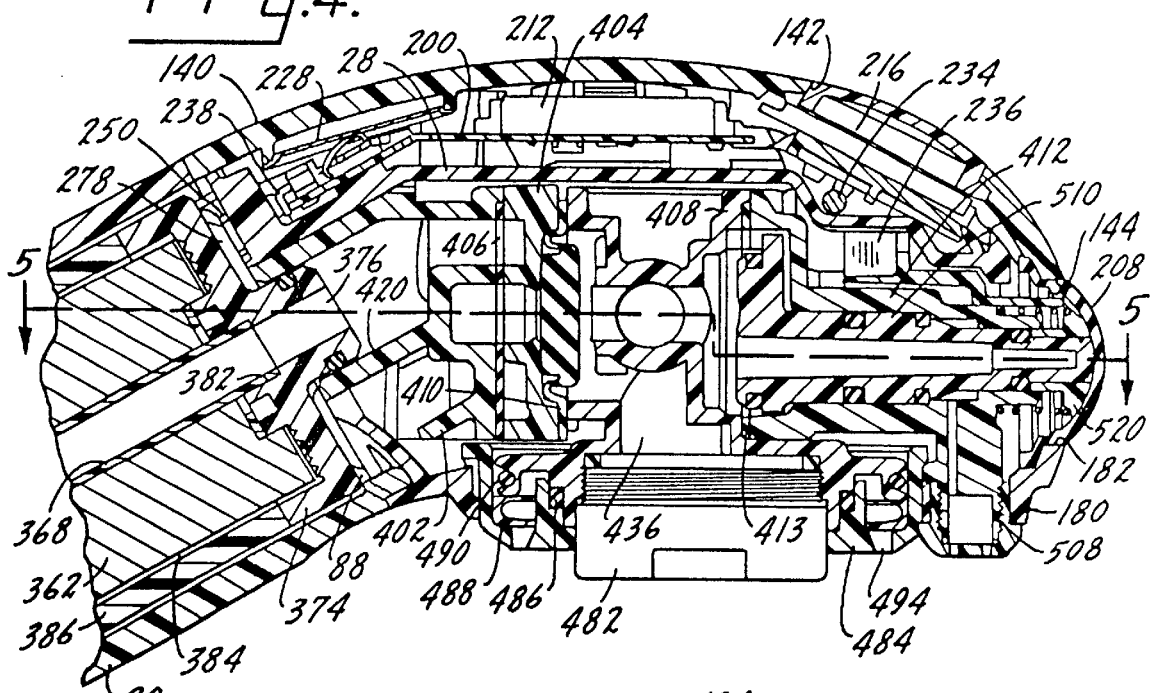
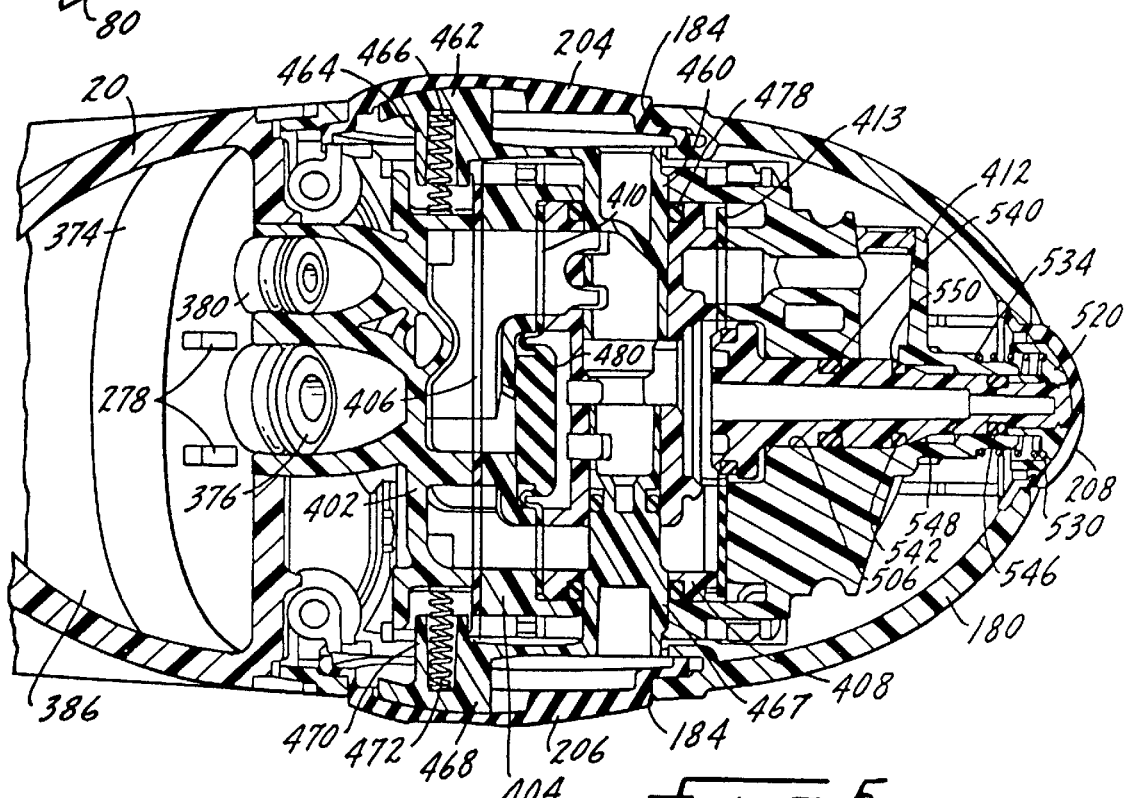

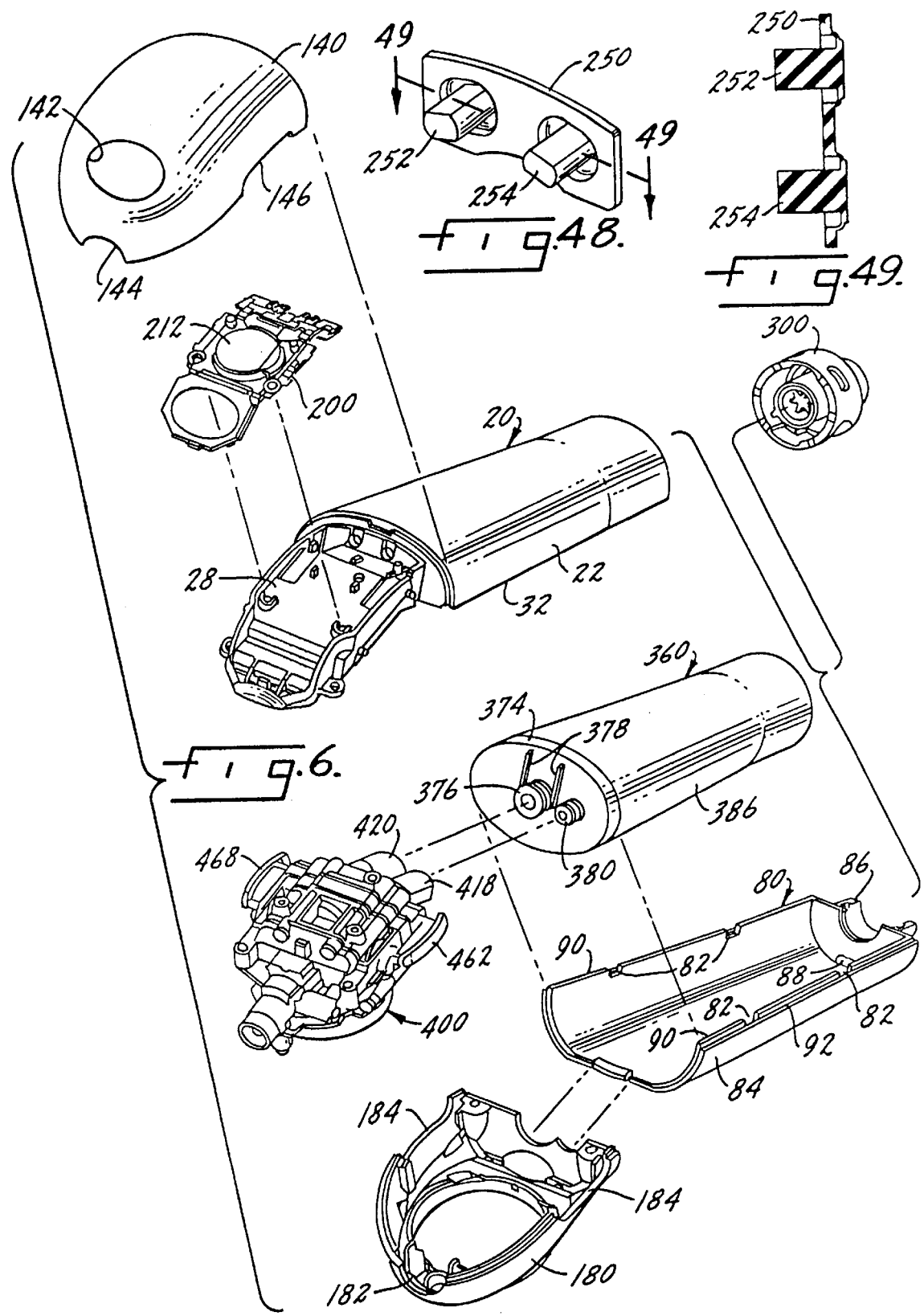

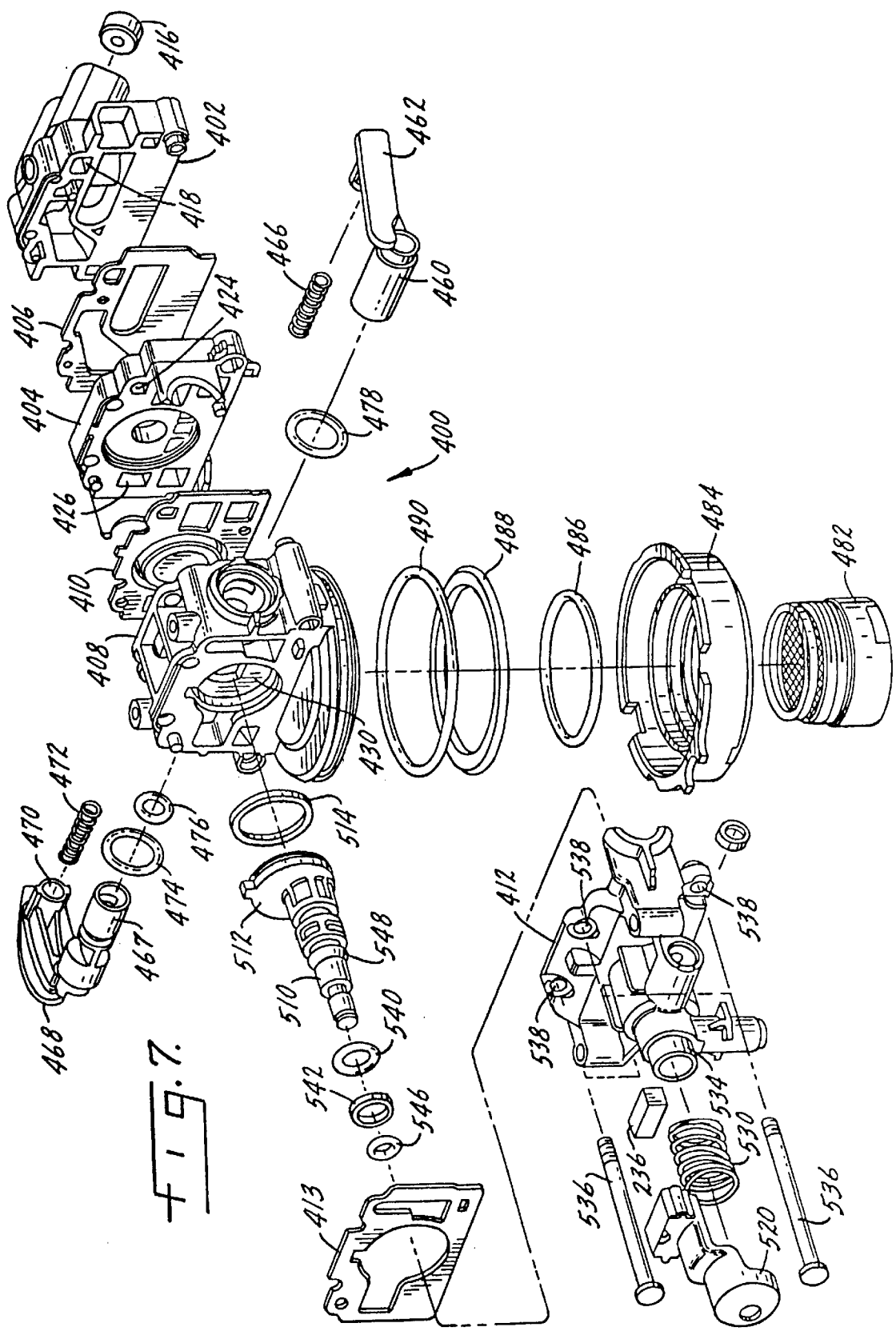

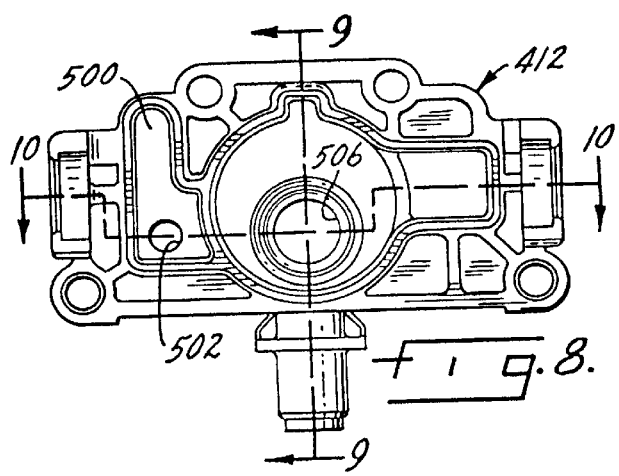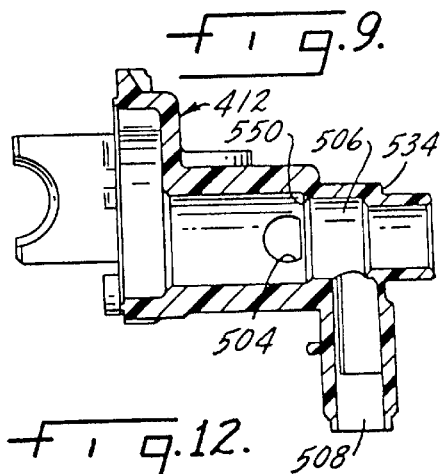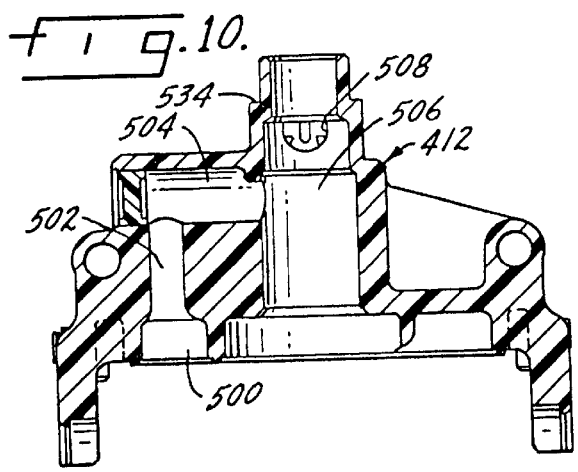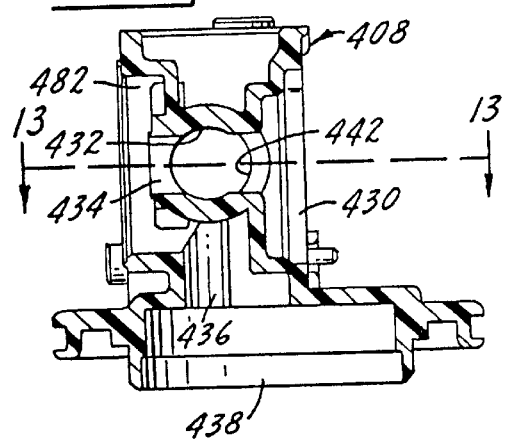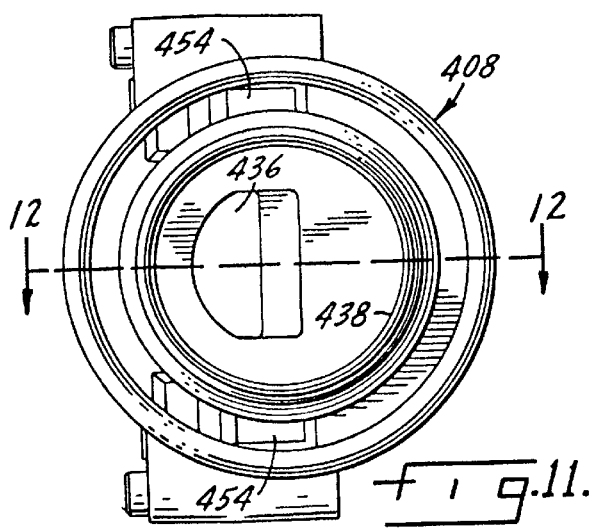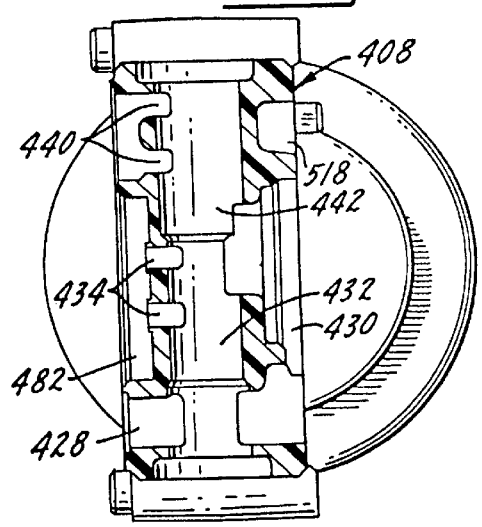

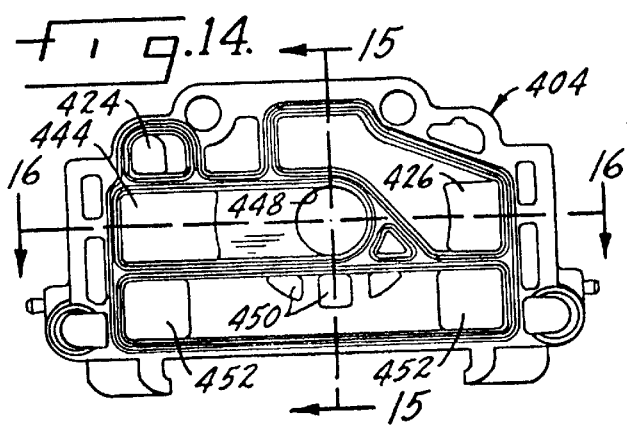
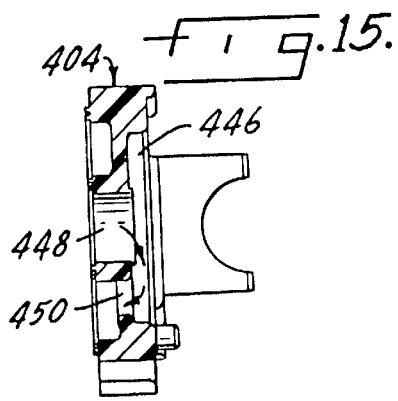
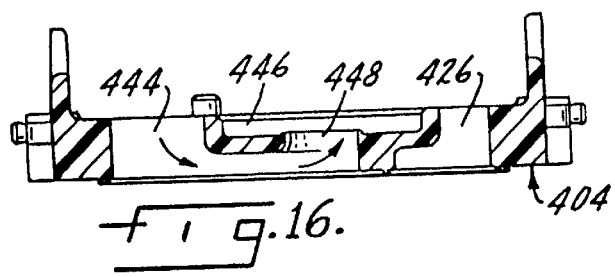
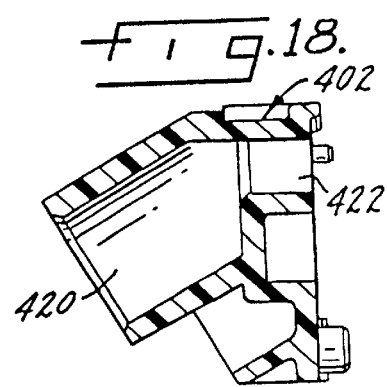
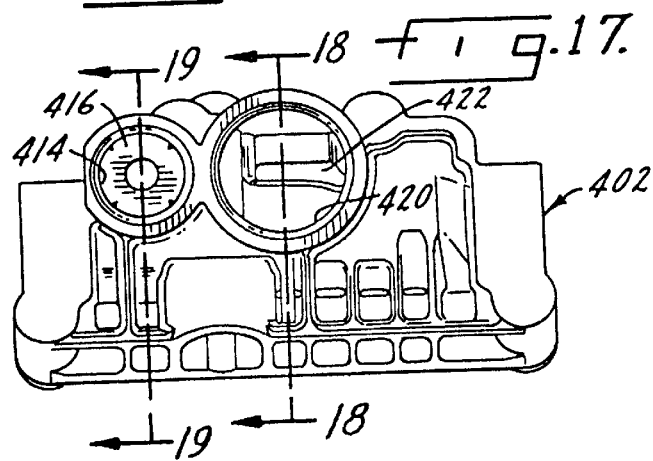
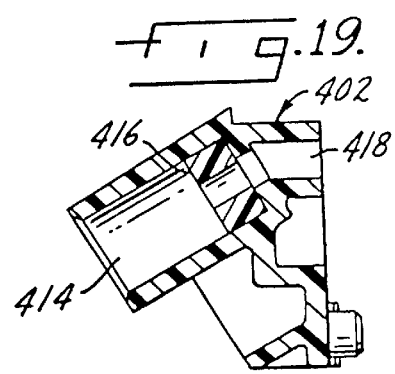

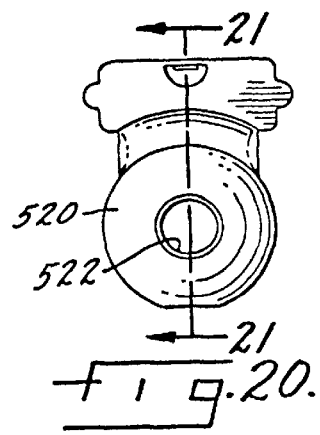
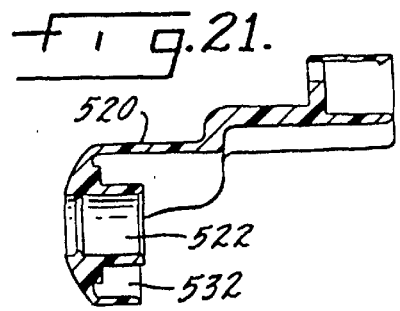
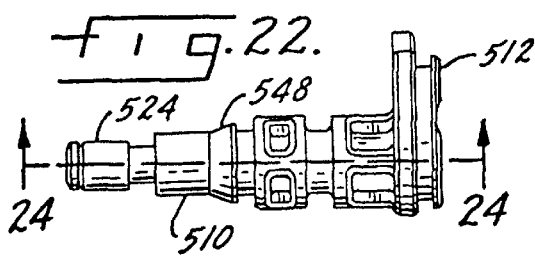
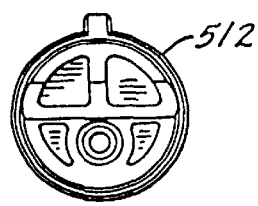
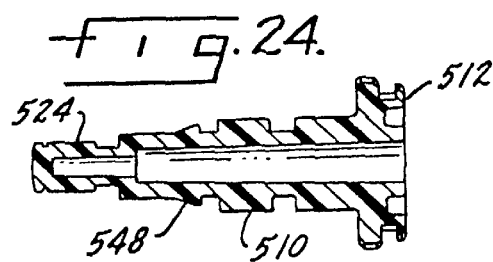
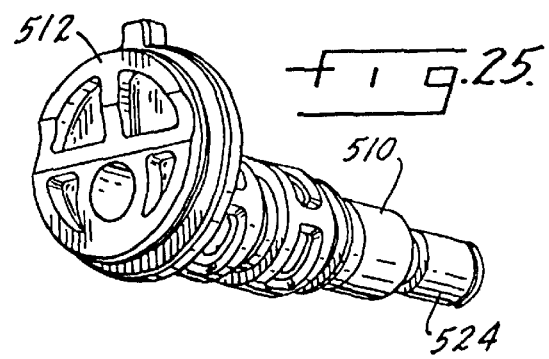
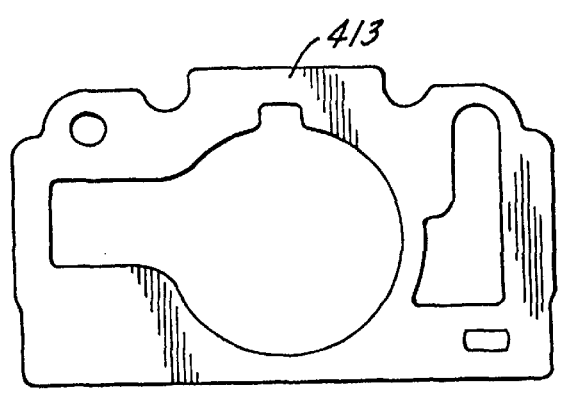
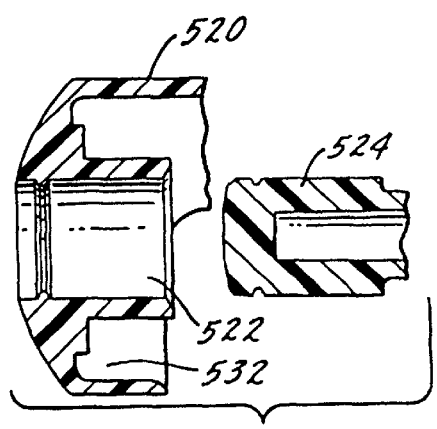

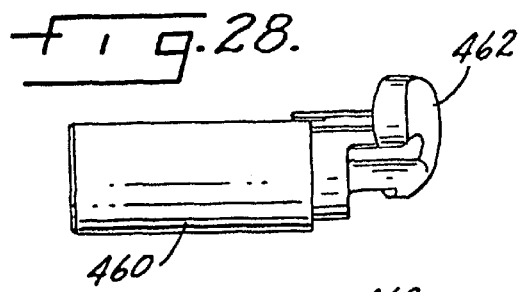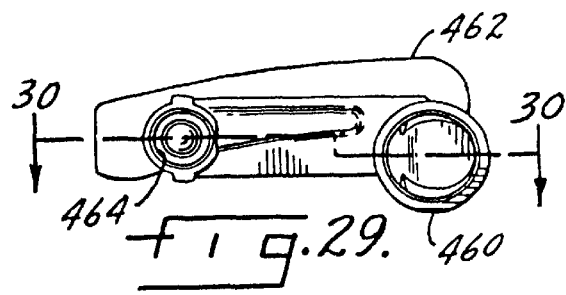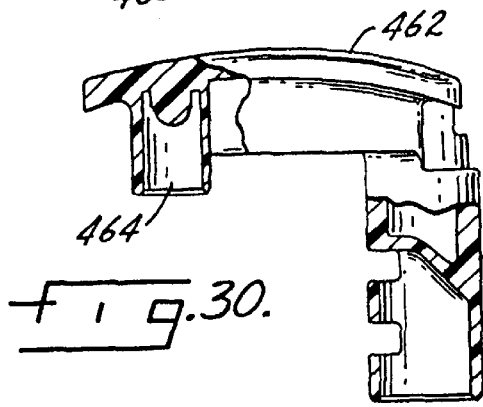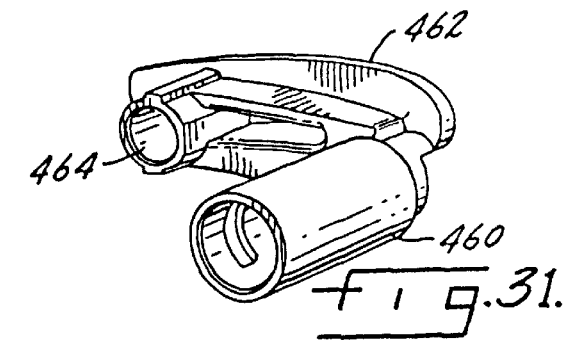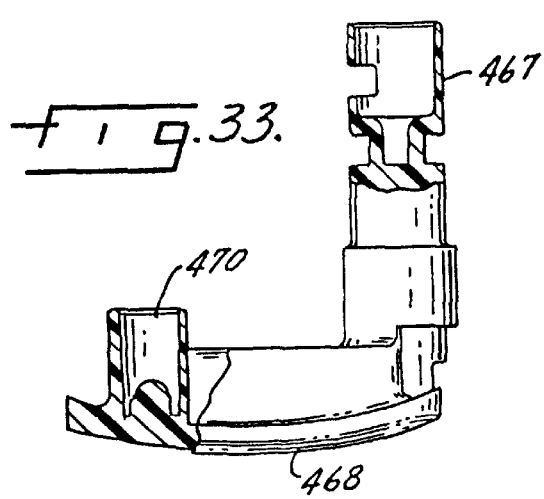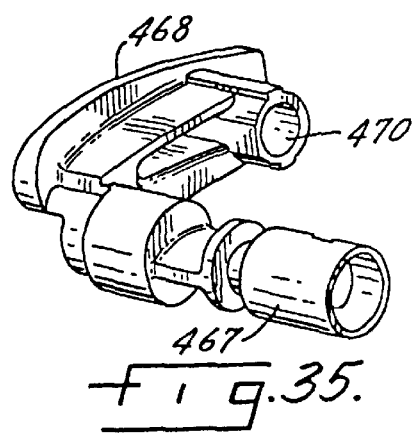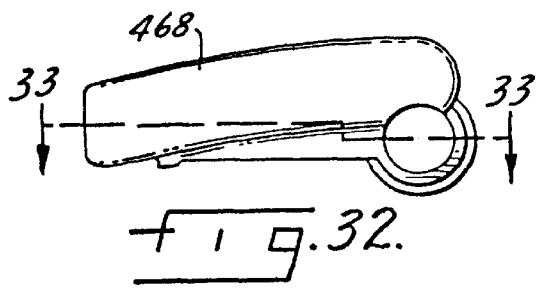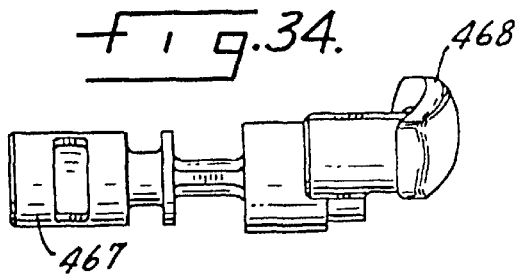

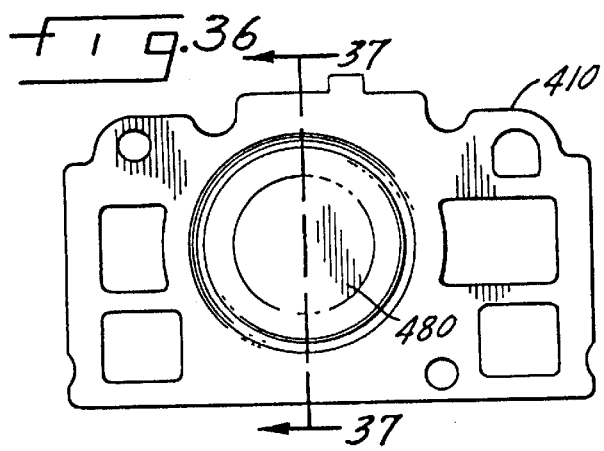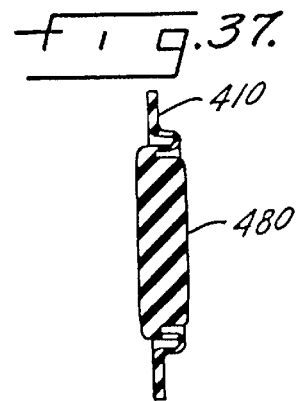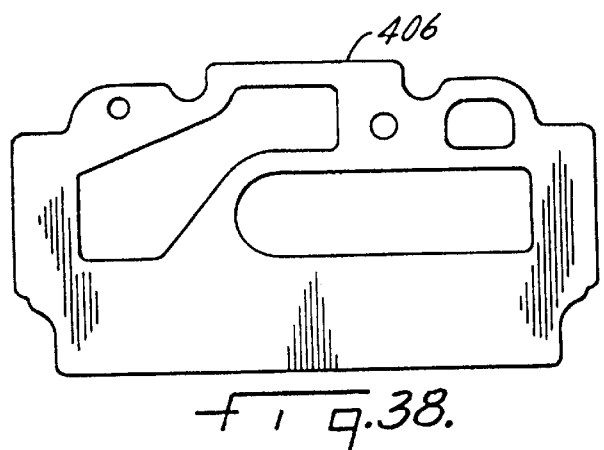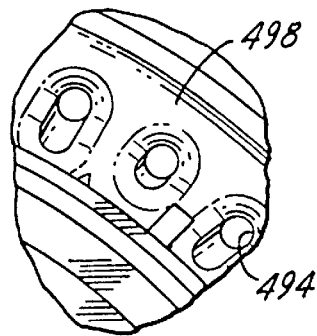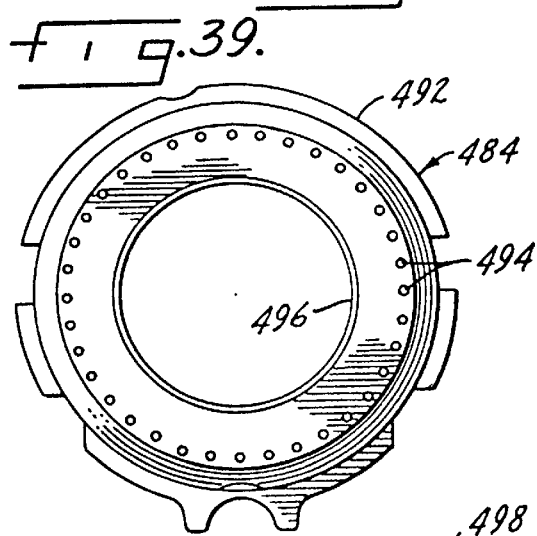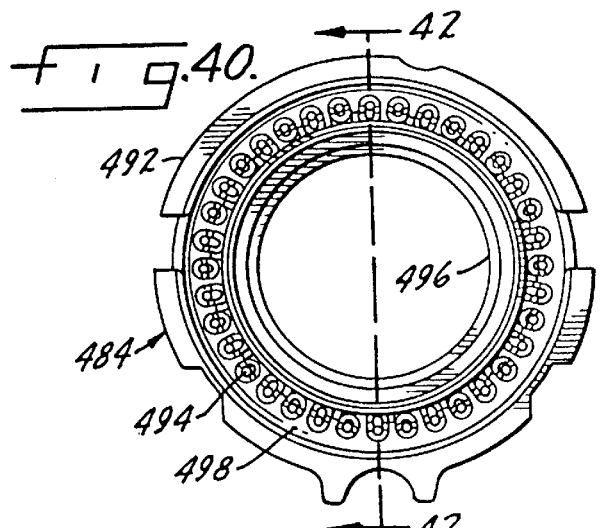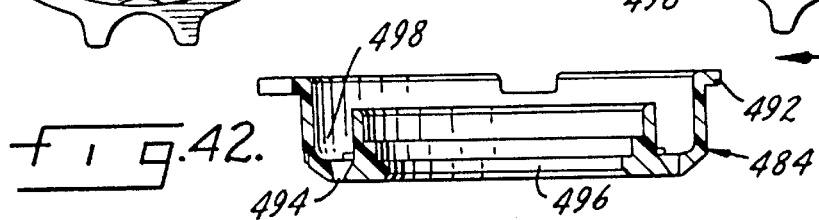

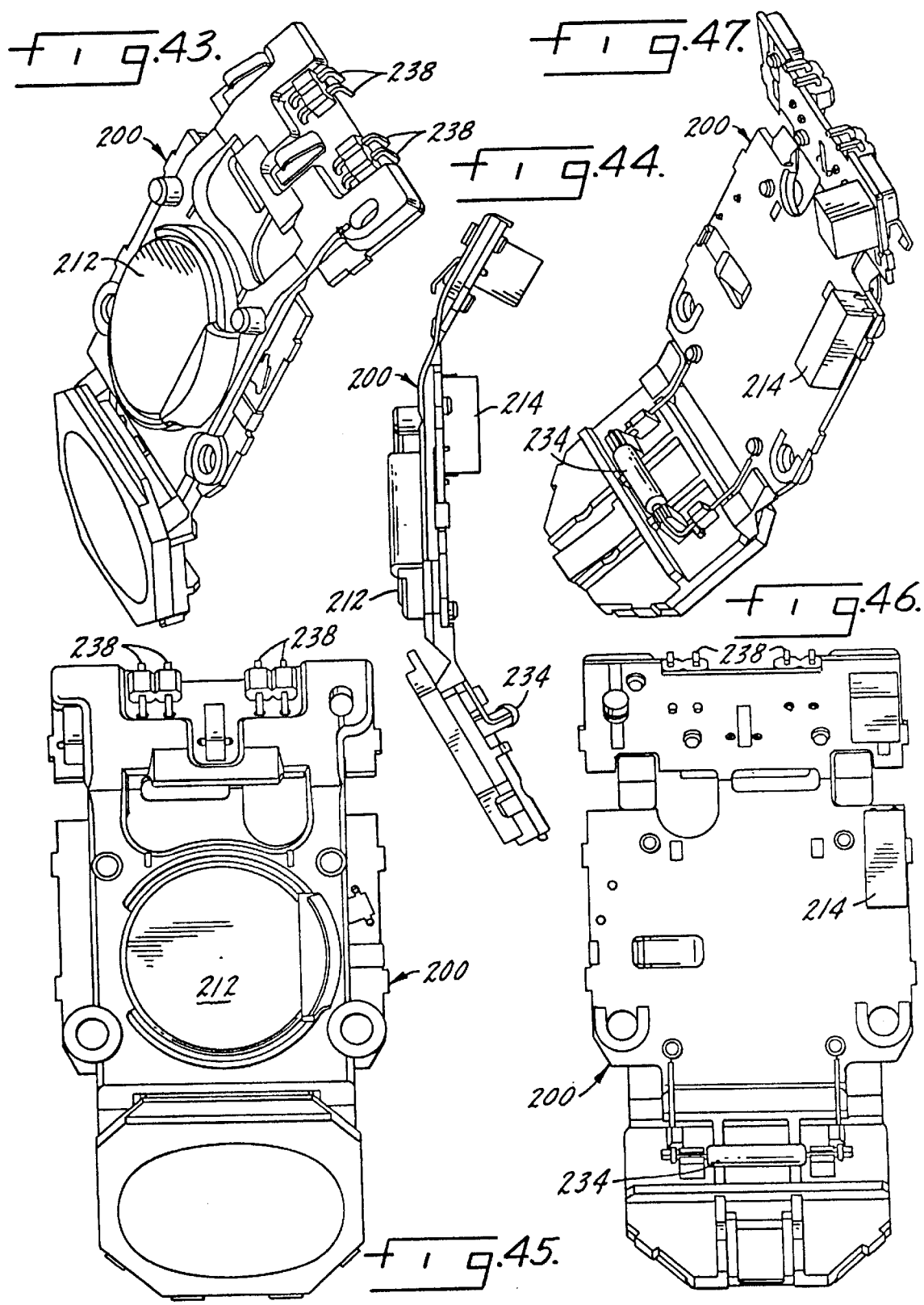

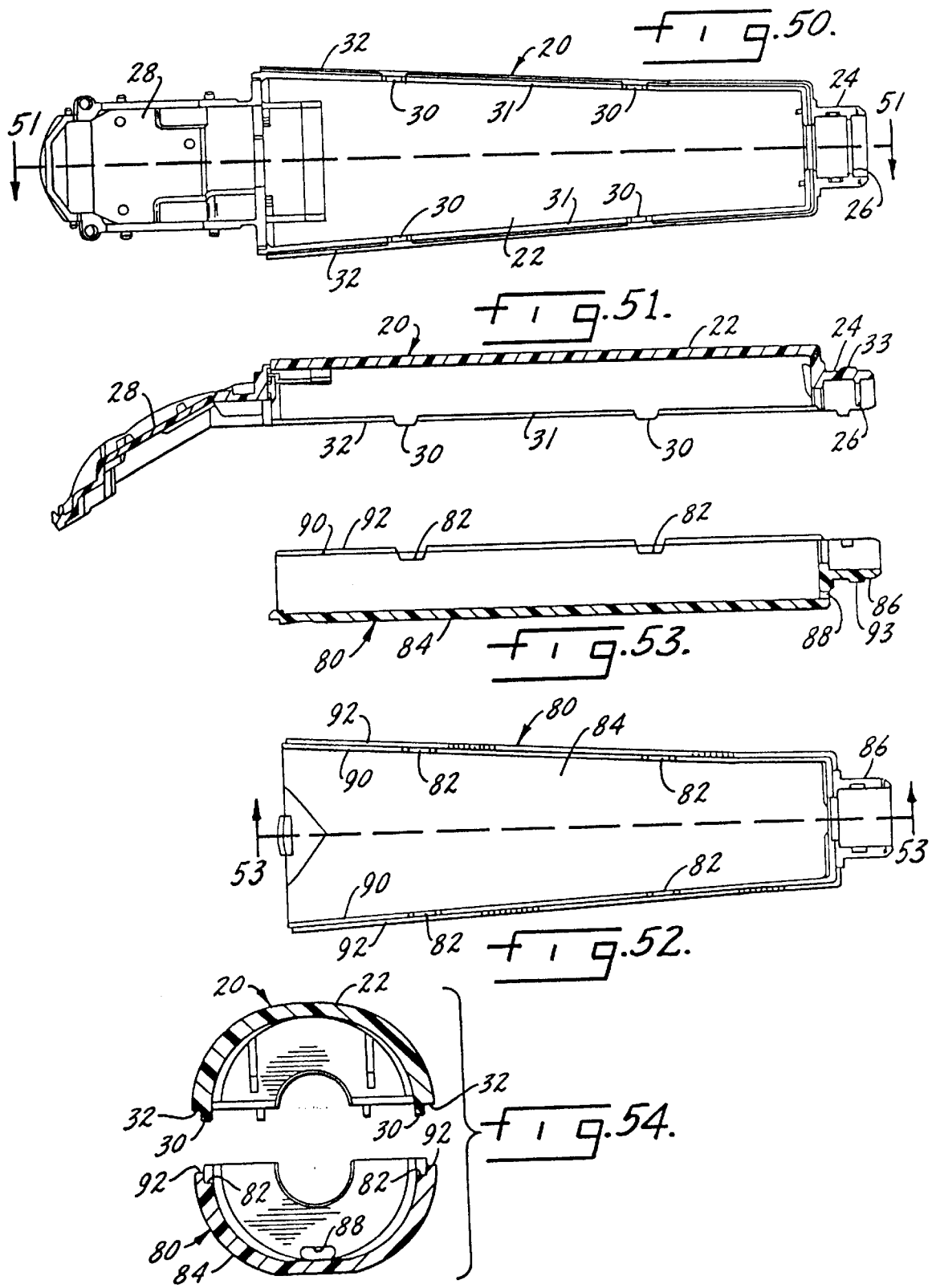

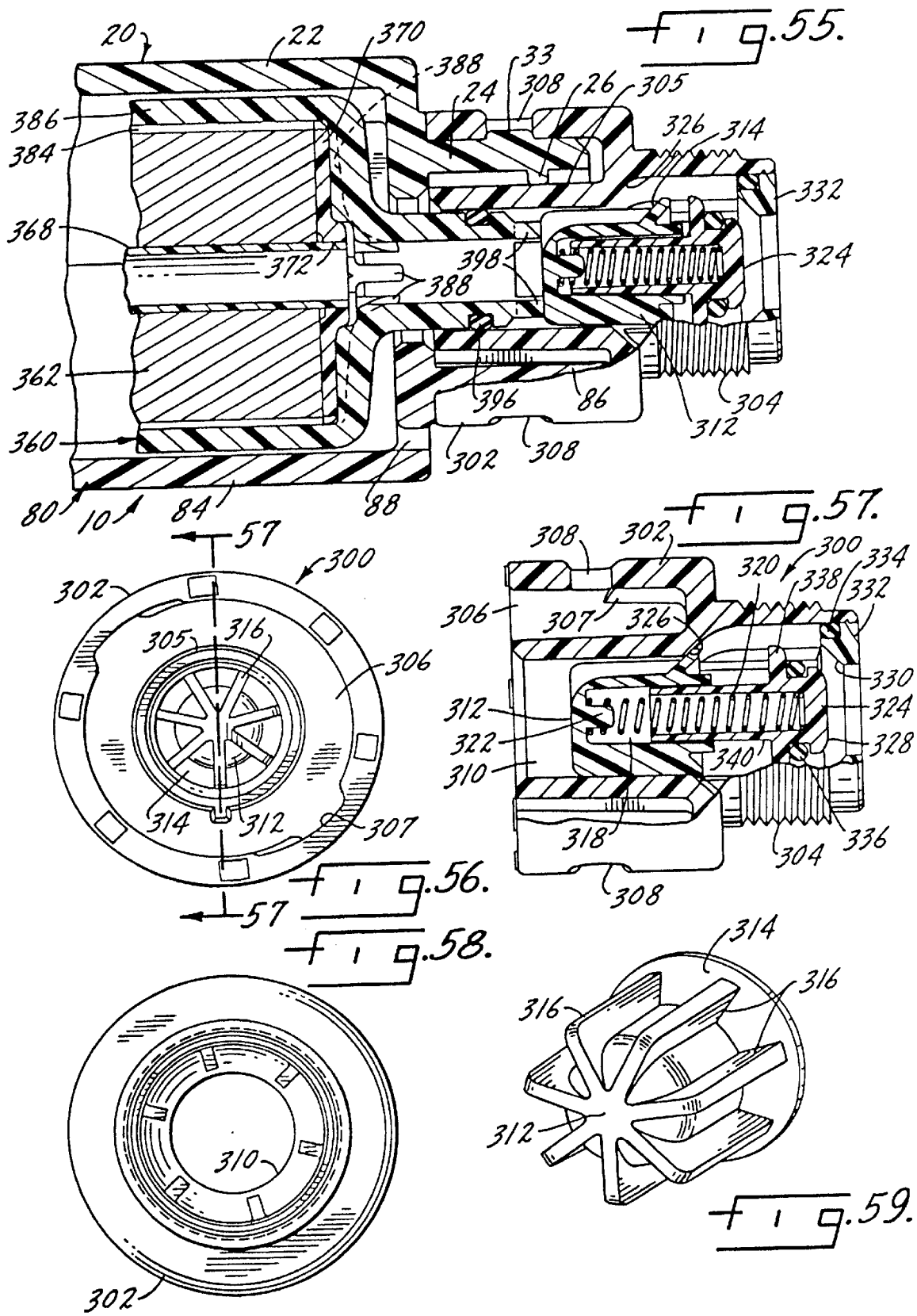

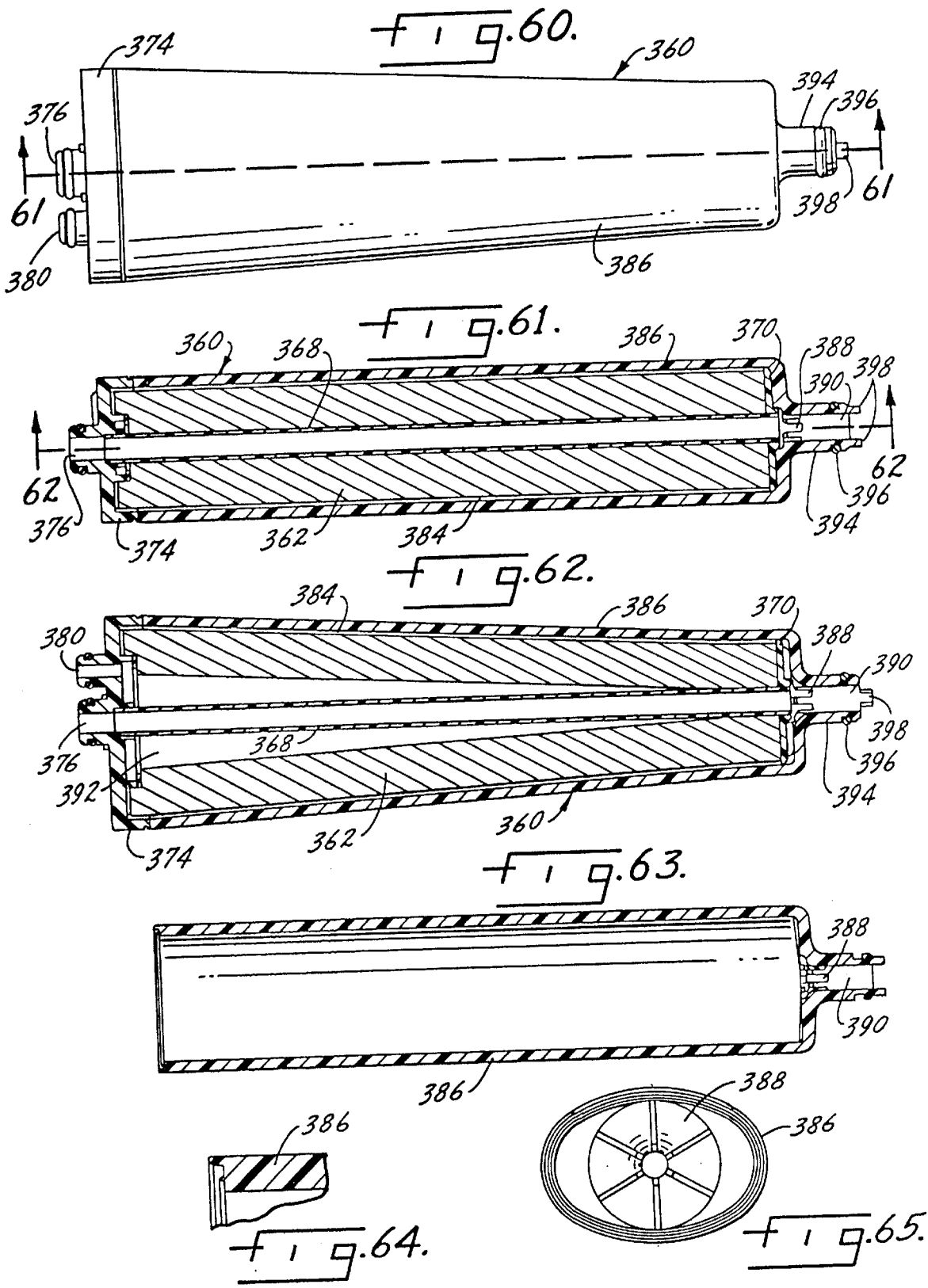

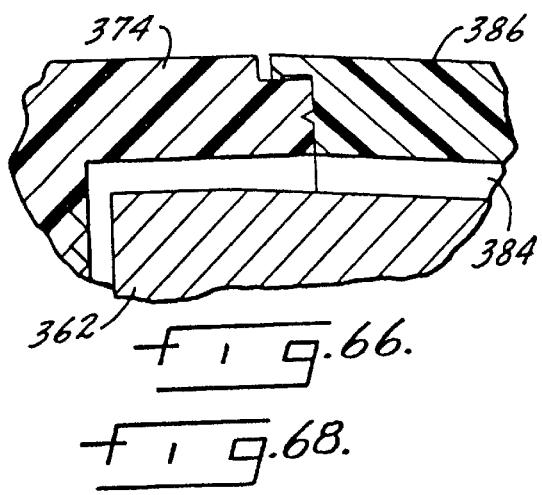
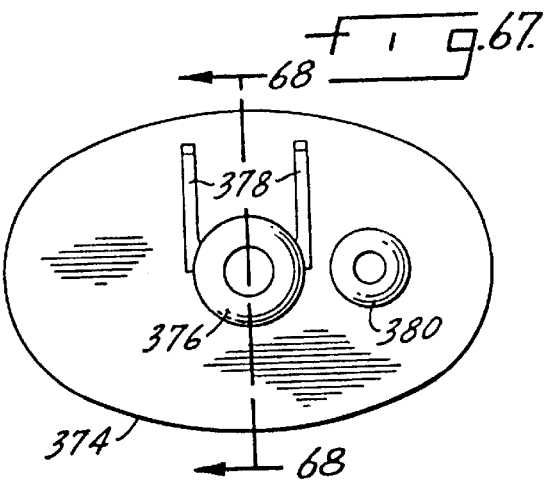
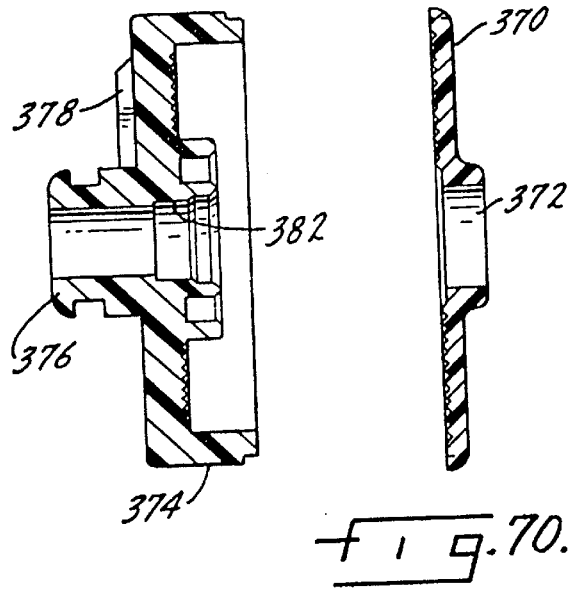
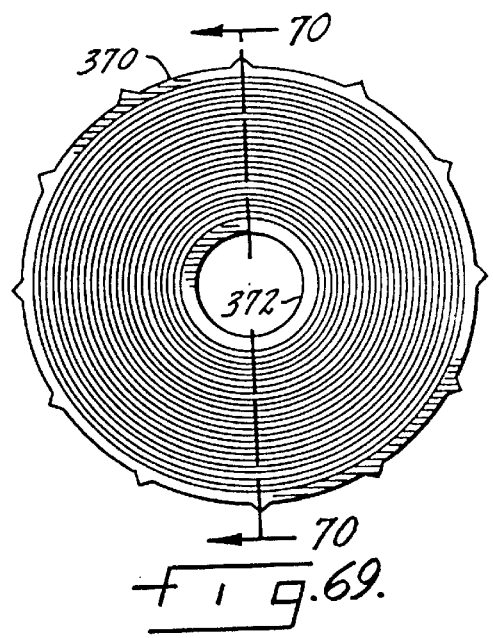
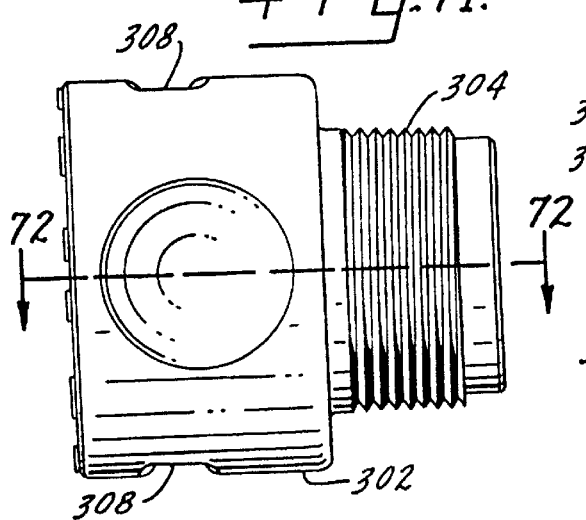
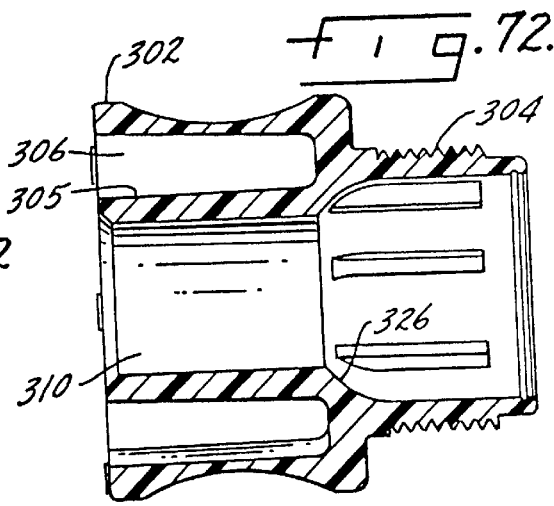

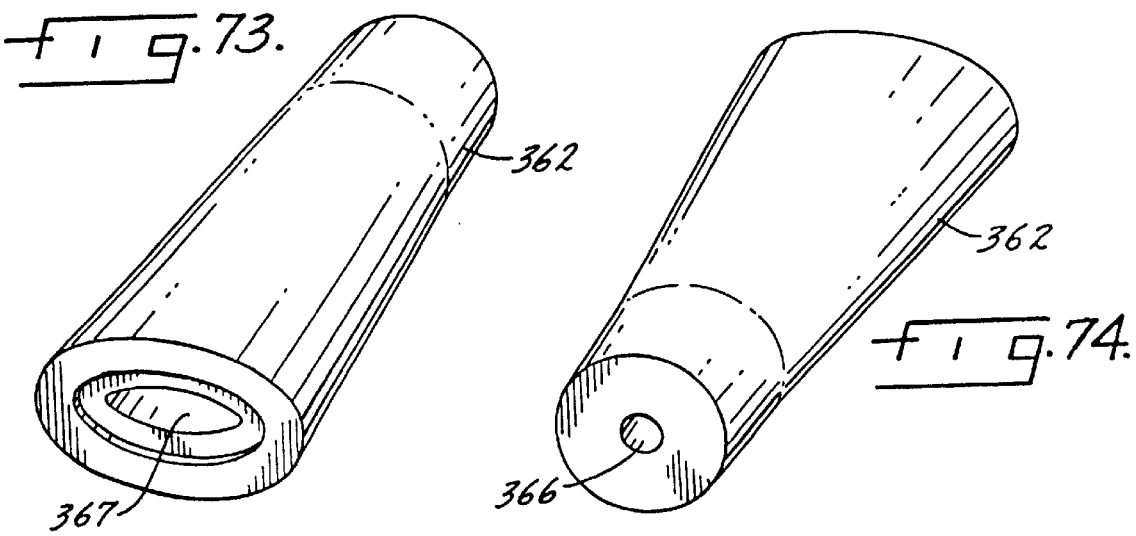
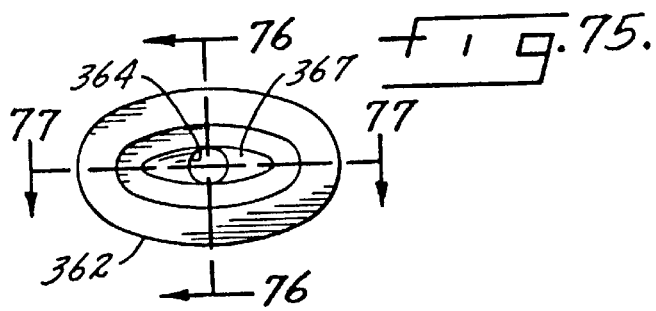
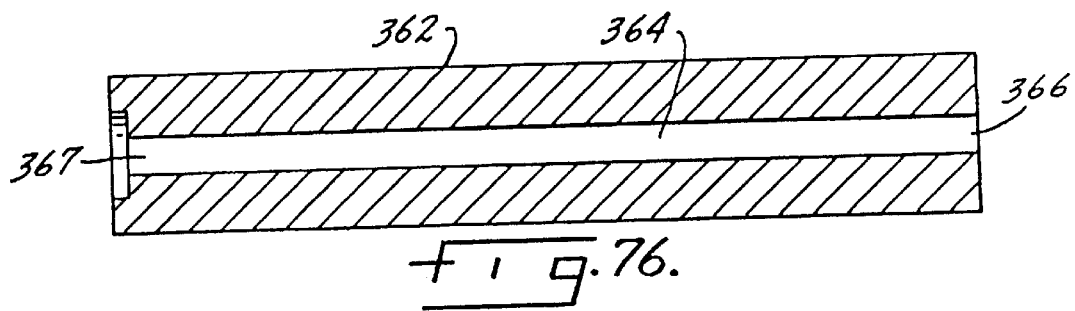
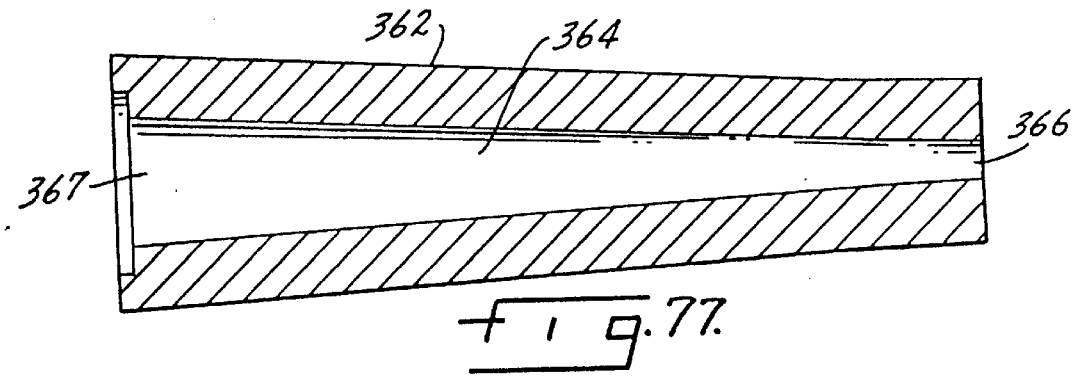

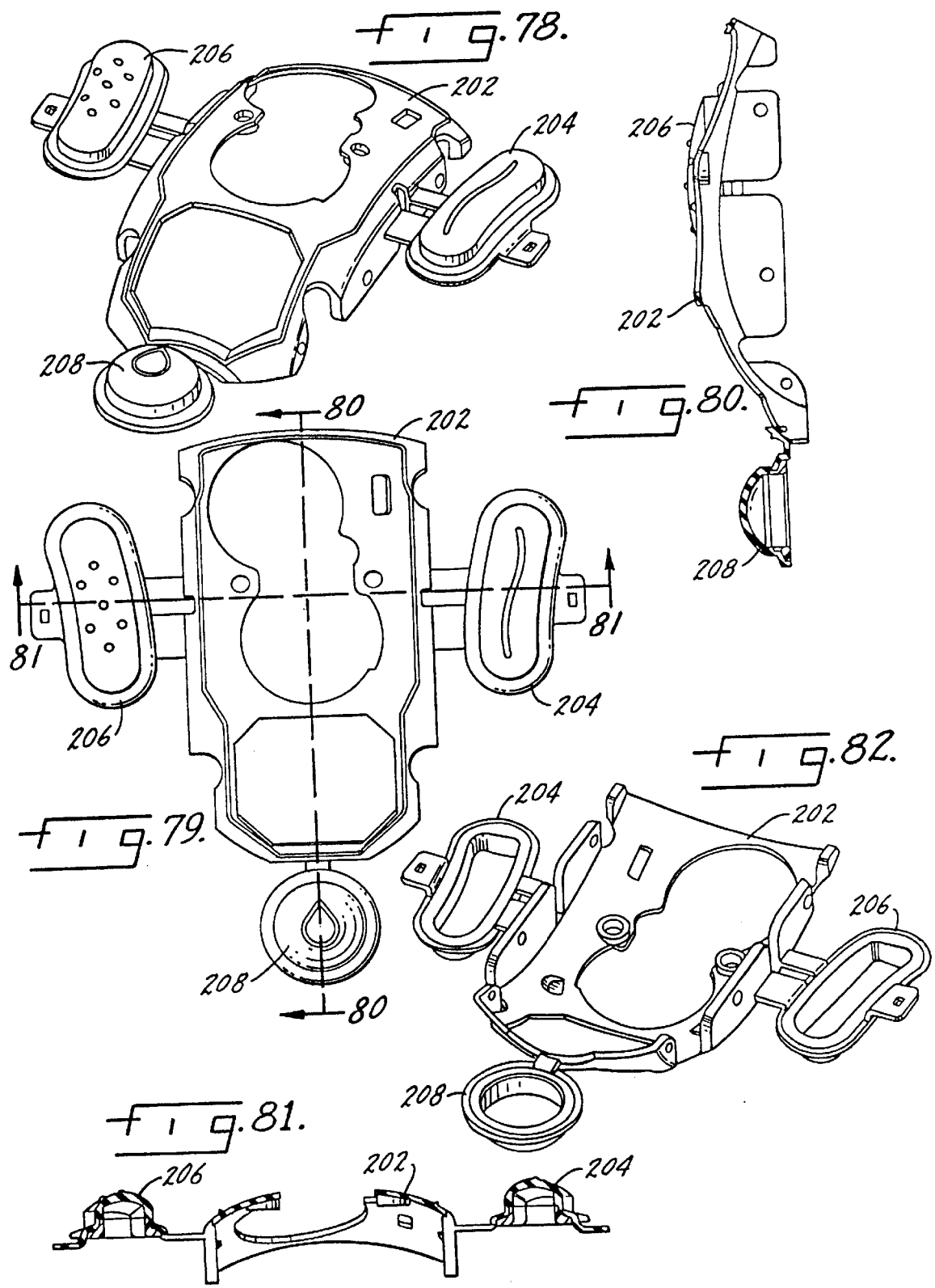

WATER FILTER CONTAINING FAUCET AND DISPLAY THEREFOR

THE FIELD OF THE INVENTION

The present invention relates to water filters and more particularly to a display associated with the water filter which provides an indication of when the filter is in use and the remaining life of the filter. The filter, its related display and electrical circuit will be described in the environment of a kitchen faucet having a pullout wand, with the wand providing for multiple discharges, one of which is filtered water. The invention should not be limited to this specific application.

The electrical circuit which drives the display includes a timer, a liquid crystal display for visual indication of the condition of the filter, as well as an audio indicator to make the filter user aware of when filter life has reached a predetermined minimum. The display and its electrical circuit may be battery driven, in which case the display will include a low battery indicator, both in audio and visual forms. The display and electrical circuit include not only a switch which is operated when the filter is in use, so that filter life may be determined by the microcontroller forming a part of the electrical circuit, but a further switch which is responsive to the type of filter. The information as to the type of filter and as to the time of usage is used by the microcontroller to provide an indication to the display of the remaining filter life.

SUMMARY OF THE INVENTION

The present invention relates to water filters for use in combination with a faucet and more specifically to a display for use with the filter indicating filter condition and other parameters relating to filter operation.

A primary purpose of the invention is a combination water filter, display and electrical circuit for driving the display such that the display gives an indication of the remaining life of the filter.

Another purpose is a combination filter, display and circuit as described, which is battery driven and in which the display not only provides an indication of filter life, but also of battery condition.

Another purpose is a combination of water filter, display and electrical circuit for use in the environment of a kitchen faucet pullout wand which has multiple discharges.

Other purposes will appear in the ensuing specification, drawings and claims.

BRIEF DESCRIPTION OF THE DRAWINGS

The invention is illustrated diagrammatically in the following drawings wherein:

FIG. 1 is a side view of the wand assembly as it would be used in a single handle faucet with portions of the valve assembly shown in section;

FIG. 2 is a side view of the wand assembly removed from the valve assembly;

FIG. 3 is a top view of the wand assembly;

FIG. 4 is a sectional view of the wand head as taken along line 4—4 of FIG. 3;

FIG. 5 is a sectional view taken along line 5—5 of FIG. 4;

FIG. 6 is an exploded perspective view showing the components which make up the wand assembly;

FIG. 7 is an exploded perspective of the valve in the wand head;

FIG. 8 is a plan view of the front valve body from the inlet side;

FIG. 9 is a section taken along line 9—9 of FIG. 8;

FIG. 10 is a section taken along line 10—10 of FIG. 8;

FIG. 11 is an underside view of the main valve body shown in relation to FIG. 5;

FIG. 12 is a section taken along line 12—12 of FIG. 11;

FIG. 13 is a section taken along line 13—13 of FIG. 12;

FIG. 14 is a plan view of the intermediate body from the inlet side;

FIG. 15 is a section along line 15—15 of FIG. 14;

FIG. 16 is a section along line 16—16 of FIG. 14;

FIG. 17 is a plan view of the rear body from the inlet side;

FIG. 18 is a section along line 18—18 of FIG. 17 showing the unfiltered water inlet;

FIG. 19 is a section along line 19—19 of FIG. 17 showing the filtered water inlet;

FIG. 20 is an end view of the filter button;

FIG. 21 is a section along line 21—21 of FIG. 20;

FIG. 22 is a side view of the filter actuator;

FIG. 23 is an end view of FIG. 22 from the inlet side;

FIG. 24 is a section along line 24—24 of FIG. 22;

FIG. 25 is an inlet side perspective of the filter actuator;

FIG. 26 is an exploded sectional side view showing the method of connection between the filter button and the stem of the filter actuator;

FIG. 27 is a plan view of the front gasket;

FIG. 28 is a side view of the stream actuator;

FIG. 29 is an inside end view of the stream actuator;

FIG. 30 is a section along line 30—30 of FIG. 29;

FIG. 31 is an inside perspective view of the stream actuator;

FIG. 32 is an outside end view of the spray actuator;

FIG. 33 is a partial section taken along line 33—33 of FIG. 32;

FIG. 34 is a side view of the spray actuator;

FIG. 35 is an inside perspective of the spray actuator;

FIG. 36 is a plan view of the diaphragm;

FIG. 37 is a section taken along line 37—37 of FIG. 36;

FIG. 38 is a plan view of the rear gasket;

FIG. 39 is an end view of the spray former as viewed from the outlet side;

FIG. 40 is an inside end view of the spray former;

FIG. 41 is an enlarged detail of FIG. 40;

FIG. 42 is a section taken along line 42—42 of FIG. 40;

FIG. 43 is a top perspective view of the PCB assembly;

FIG. 44 is a side view of FIG. 43;

FIG. 45 is a top plan view;

FIG. 46 is a bottom plan view;

FIG. 47 is an underside perspective of the PCB assembly;

FIG. 48 is a perspective view of the filter I.D. keypad;

FIG. 49 is a section along line 49—49 of FIG. 48;

FIG. 50 is an underside plan view of the wand body top;

FIG. 51 is a sectional view taken on line 51—51 of FIG. 50;

FIG. 52 is an inside plan view of the wand body bottom;

FIG. 53 is a sectional view taken along line 53—53 of FIG. 52;

FIG. 54 is an exploded sectional view of the wand housings;

FIG. 55 is a sectional detail of the inlet end of the wand assembly;

FIG. 56 is an end view of the quarter turn connector with integral check valves;

FIG. 57 is a section taken along line 57—57 of FIG. 56;

FIG. 58 is an end view of the quarter turn connector with the check valves omitted as viewed from the right side of FIG. 57;

FIG. 59 is a perspective view of the anti-flow spool of one of the check valves;

FIG. 60 is a plan of the filter assembly;

FIG. 61 is a sectional view of the filter assembly taken along line 61—61 of FIG. 60;

FIG. 62 is a sectional view taken along line 62—62 of FIG. 61;

FIG. 63 is a sectional view of the filter jacket;

FIG. 64 is an enlarged detail of the filter jacket end;

FIG. 65 is an end view of the filter jacket;

FIG. 66 is an enlarged sectional detail showing the attachment of the filter jacket cap;

FIG. 67 is an end view of the filter jacket cap;

FIG. 68 is a sectional view taken along line 68—68 of FIG. 67;

FIG. 69 is a plan view of the filter carbon end cap;

FIG. 70 is a sectional view taken along line 70—70 of FIG. 69;

FIG. 71 is a side view of the quarter turn connector;

FIG. 72 is a sectional view taken along line 72—72 of FIG. 71;

FIG. 73 is a perspective view of the filter carbon block as viewed from the exit end;

FIG. 74 is a perspective view of the filter carbon block as viewed from the inlet end;

FIG. 75 is an end view of FIG. 73;

FIG. 76 is a section along line 76—76 of FIG. 75;

FIG. 77 is a section along line 77—77 of FIG. 76;

FIG. 78 is a top perspective of the boot assembly;

FIG. 79 is a top plan view;

FIG. 80 is a section along line 80—80 of FIG. 79;

FIG. 81 is a section along line 81—81 of FIG. 79;

FIG. 82 is an underside perspective of FIG. 78;

Figure 83:
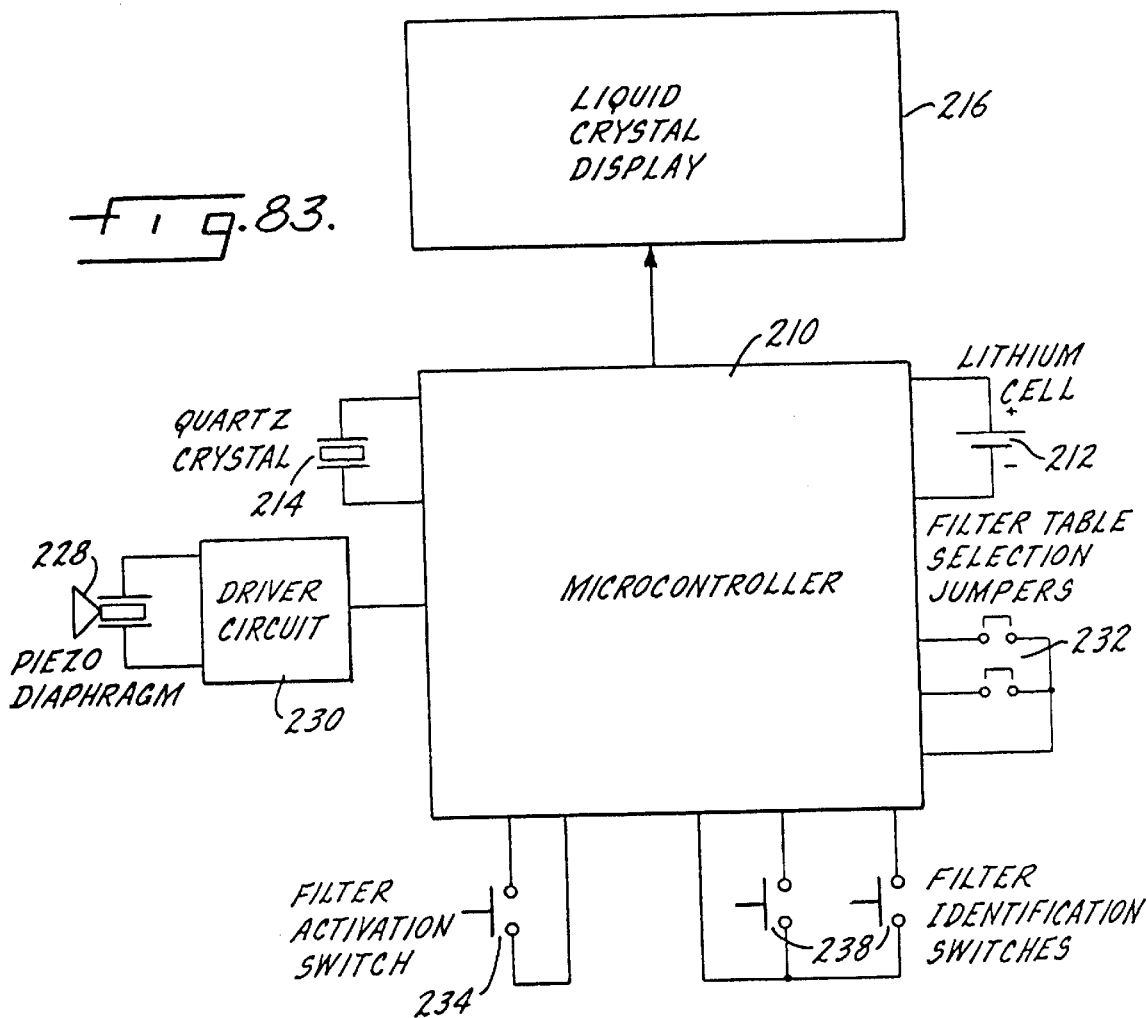
FIG. 83 is a block diagram of the wand assembly electronics.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the present invention is not necessarily limited to the particular embodiments illustrated herein.

DESCRIPTION OF THE PREFERRED EMBODIMENT

The present invention relates to a faucet assembly primarily for use in a kitchen environment. It includes a wand, attached by a hose to a faucet control valve which may be either a single lever mixing valve or a two-handle control valve system. The wand may be pulled out from the faucet housing, along with its hose connection, so that it may be directed by the user to various portions of the sink area.

The wand provides a stream discharge, a spray discharge, and a filtered water discharge. When the water is initially turned on, the discharge will be in a stream form. To change to a spray, the user presses a spray button. To return to a stream discharge, the user may either turn off the water or press the stream button. To provide a filtered water discharge, the user presses the filter button, adjacent the nose of the wand and there will be a filtered water discharge. When the wand is in the filtered water position, there is a visual readout providing information to the user as to the remaining life of the filter and the condition of the battery, as will be explained in more detail hereinafter. The faucet is returned from a filtered water discharge to a stream discharge by turning off the water. In the case of each of the three types of water discharge, once a button or control element is pressed, it may be released and will remain in the designated position.

In FIG. 1, the faucet is shown using a single lever mixing valve cartridge. The wand assembly is indicated at 10 and the faucet handle is indicated at 12. There is a faucet body 14 within which is positioned a housing 16 containing a mixing valve 18. Water will be directed from the mixing valve through a hose 19 to the base of the wand assembly 10. The faucet handle 12 and mixing valve 18 form no specific part of the present invention and are only a means to provide water to the input of the wand assembly. The water is mixed in that it has varying proportions of hot and cold water, as determined by the position of the control handle 12.

As illustrated particularly in FIG. 6, the wand assembly has certain basic parts, each of which will be described in detail hereinafter. The wand assembly includes a wand body top 20, a wand body bottom 80, an upper cover 140 and a lower cover 180. Positioned within the housing assembly made up of the above-described elements is a printed circuit board assembly (PCB assembly) 200 and a wand control valve 400. The input for the wand assembly is provided by a check valve assembly 300. The above-described parts, when assembled as described hereinafter, provide the three types of water discharge as determined by the positions of the control buttons.

The check valve assembly 300 is illustrated in FIGS. 55 through 59, 71 and 72. The check valve assembly 300 provides the connection between the hose 19 and the wand assembly 10 and includes an outer connector 302 having exterior threads 304 for making the hose connection. There is a circumferential cavity 306 within the connector 302 for use in making a quarter turn bayonet-type connection with the end of the wand assembly. To this end, there are a plurality of cam recesses 307 and openings 308 in the peripheral wall of the connector 302 to receive cooperating projections on the end of the wand housing.

Within the connector 302 there is a central passage 310 which is the water passage through the connector assembly to the wand assembly. Within the passage 310 is positioned an antiflow spool 312 illustrated particularly in FIG. 59. The spool 312 has a conical seat 314 and a plurality of radially extending guide ribs or fins 316. The space between the ribs 316 provides for water flow and the ribs provide a guiding function to maintain proper orientation of the antiflow spool within the passage 310. The antiflow spool 312 has an interior cavity 318 within which is positioned a spring 320. The spring 320 is seated on a boss 322 and is effective to urge the antiflow spool 312 and an antisiphon spool 324 in opposite axial directions. The spool 312 will normally have its conical seat 314 in peripheral contact with a seat 326 on the interior of passage 310 to close off the flow of water into the wand assembly. Insertion of the filter cartridge, as described hereinafter, will move the antiflow spool 312 off of the seat 326 to allow water flow. The spring 320 normally closes the antisiphon spool 324 to prevent back siphonage. The antisiphon spool 324 is opened by water flow as it comes from the hose connection.

The antisiphon spool 324 has an O-ring seal 336 positioned within a groove adjacent an outwardly extending flange 338. There is an axially extending projection 340 which houses the spring 320 and is positioned within the cavity 318 of the antiflow spool 312.

The spool 324 has a truncated conical nose 328 which seats against a conical surface 330 on a retainer 332. An O-ring 334 seals the retainer to the interior of the passage 310 as formed by the connector 302. When water flows to the wand assembly by the operation of faucet handle 12, the applied water pressure will move the antisiphon spool to the open position shown in FIG. 57 permitting water to flow around it. Assuming the antiflow spool is in an open position, which will result from the insertion of a filter cartridge within the wand, water flow will pass through the connector assembly 300 into the wand assembly. FIG. 55 illustrates the position of the check valve assembly 300 assembled onto the inlet end of the wand assembly.

The wand body top 20 is illustrated in FIGS. 50 and 51 and the wand body bottom 80 is illustrated in FIGS. 52 and 53. FIG. 54 illustrates the wand body top and bottom from an end view in a slightly separated position. The wand body top 20 has a partially frustoconic outer cover 22 and a partial cylindrical projection 24 which forms a part of the inlet connection with the check valve assembly. The interior of projection 24 has a circumferential rib 26 which will bear against the interior wall 305 of cavity 306 when the wand bodies are attached to the check valve assembly as shown in FIG. 55. Rib 26 provides orientation to insure proper connection with the check valve assembly. Wand body top 20 further includes a support 28 which will mount the PCB assembly 200, as will be described hereinafter. The wand body top 20 has four spaced lugs or projections 30 which will interact with mating recesses 82 formed in an opposing edge of the cover 84 of wand body bottom 80.

The wand body bottom has a cylindrical projection 86 similar to the projection 24 on the wand body top, which projections together define the cylindrical connection with the check valve. The wand body bottom further has a weep opening 88 at the inlet end to permit seepage of any water which may accumulate within the wand assembly. As particularly shown in FIG. 54, the connection between the two wand bodies, in addition to the described lugs and mating recesses, includes what is known as a half lap joint. The wand body top 20 along the edge which mates with the wand body bottom has a continuous interior flange 31 and an adjacent rabbeted groove 32. The mating edge of the wand body bottom has an interior projection 90 and a rabbeted groove 92. These two elements, when joined, provide a secure connection between the top and bottom wand bodies.

The wand bodies are held together at the inlet side by the exterior cams 33 and 93 located on projections 24 and 86 which form a bayonet connection with the check valve assembly 300. The cam elements 33 and 93 will interact with the openings 308 in the connector 302 once the wand body and check valve assembly have been axially moved to the position of FIG. 55, after which the check valve assembly is given a quarter turn so that the cams will interact in the manner shown in FIG. 55.

The exterior of the wand assembly is completed by the upper cover 140 and the lower cover 180. The upper cover includes a visual display opening 142, which will be described in more detail and is shown specifically in FIG. 84. The upper cover 140 further has a front recess 144 and there is a similar recess 182 in the lower cover, with the recesses, when combined in the assembled position, providing an opening for the filtered water discharge button. Similarly, each of the upper and lower covers has recesses 146 and 184, respectively, for the spray and stream buttons to be described later.

The filter assembly is illustrated in FIGS. 60, 61 and 62, the filter jacket is illustrated in FIGS. 63 through 70, and the filter is illustrated in FIGS. 73 through 77. Focusing initially on the filter per se, it will consist of carbon granules, a binder and a lead scavenger. Acceptable proportions of these elements would include approximately 10–14 grams of a lead scavenger which may be a product called ATS manufactured by Engelhard Corporation, 20 grams of a binder which may be polyethylene, and approximately 30 grams of carbon particles. The carbon particles should be of a size which would pass through an 80×325 mesh screen, although the invention should not be so limited. It is desirable that the carbon block filter remove any particle greater than one micron which will eliminate certain potentially medically harmful microorganisms. The one micron size is a nominal rating for the filter.

The filter is indicated at 362 and as shown in FIGS. 73 through 77, has a generally frustoconic exterior. There is an interior passage 364 which is somewhat tapered, gradually enlarging from the inlet end 366 to the outlet end 367. Positioned within the passage 364, as particularly shown in FIGS. 60 through 62, is a tube 368 which provides a direct unfiltered water connection from the inlet end of the filter assembly 360 to the outlet end.

The inlet end of the filter includes an end cap 370, shown in FIGS. 69 and 70, having an interior opening 372 which centers the tube 368 at the inlet end of the filter. At the outlet end of the filter there is a filter jacket cap 374, illustrated in FIGS. 67 and 68, which may be ultrasonically welded to filter jacket 386. There are two outlet ports. The center port 376 has two filter identification projections 378 adjacent thereto, the purpose of which will be described in connection with the electronic system for the wand. Directly adjacent to port 376 is a filtered water outlet port 380. The tube 368 extends into the opening 382 of the cap which leads to the port 376 with the filtered water port 380 being in communication with the area extending about the unfiltered water tube 368.

As shown particularly in FIGS. 61 and 62, there is a thin peripheral chamber 384 between the exterior of the carbon block filter 362 and the interior of the filter jacket 386. Water may flow into the chamber 384 through a plurality of grooves 388 at the inlet end of the filter jacket as particularly shown in FIGS. 62 and 63. Thus, water flowing into the inlet port 390, from the check valve assembly 300, will flow both into the tube 368 and into the peripheral chamber 384. Water flowing into the peripheral chamber must radially flow through the carbon block filter in order to reach the tapered annular space 392 which is inside of the filter and on the exterior of tube 368. Thus, filtered water can then flow to the filtered water discharge port 380.

Focusing on the inlet of the filter assembly, the projection 394 of the filter jacket 386 has an O-ring seal 396 and a pair of spaced projections 398, as particularly shown in FIGS. 61 and 62. These projections, as shown in FIG. 55, are effective to move the antiflow spool 312 away from its seat 326 to permit water to flow into the filter assembly. Thus, unless a filter cartridge is positioned within the wand assembly, no water can flow into it. The projections on the filter assembly are required in order to open the antiflow spool. Accordingly, the projections provide a safety feature, as when a filter is being changed, no water will flow into the wand.

The wand control valve assembly will be described in connection with FIGS. 7 through 19. The control valve assembly includes a rear body 402 shown in FIGS. 17, 18 and 19; an intermediate body 404, separated by a gasket 406 from rear body 402 and illustrated in FIGS. 14 through 18; a main valve body 408 separated by a gasket/diaphragm 410 from the intermediate body 404 and illustrated in FIGS. 11, 12 and 13; and a front body 412 separated by a gasket 413 from main body 408 illustrated in FIGS. 8 through 10.

Starting at the input to the control assembly, the rear body 402 has a filtered water input 414 which includes a flow control element 416 and is connected to a filtered output port 418. This is shown in FIG. 19. Input 414 will connect with filtered water output 380 (FIG. 67). The unfiltered water from filter assembly output 376 flows into an inlet port 420 and out through an outlet port 422. This is water for either the spray or stream discharge.

The intermediate valve body 404 shown in FIGS. 14, 15 and 16 has a filtered water passage 424 which receives water from rear body outlet 418 and passes the filtered water directly to the main body. Unfiltered water from the rear body flows into a passage 426 in the intermediate valve body 404, note FIG. 16, and then flows into a main body passage 428 shown in FIG. 13. The unfiltered water passes through the main body 408 and makes a 90 degree bend to flow into a cavity 430 at the front or outlet side of the main body. The unfiltered water then turns 90° again and flows through a cavity 432, which would normally be filled with the spool from the spray control button, with water exiting from cavity 432 through small passages 434, as shown particularly in FIG. 12. Assuming the wand is in the stream position, water will then flow down through a further passage 436 to the stream outlet 438. Thus, the unfiltered water will flow through the stream outlet 438, assuming the valve is in the stream position and the spray button has not been operated.

If the spray button has been operated, water will not be able to flow through passages 434 and discharge from the main body through passages 440, from a cavity 442 and this water will return to the intermediate body and flow into a port 444 shown in FIG. 16. The water destined for a spray discharge will make two 90-degree turns, then pass through opening 448 into a cavity 446 in the front of the intermediate body. Water will then flow down, and again reverse direction and flow to the other side of the intermediate body through three openings 450. The water will then split and make opposite 90-degree turns and flow back to the main body through a pair of spaced ports 452. Thus, the spray water will then flow from the intermediate body ports 452 to the main body for discharge into a spray former cavity and through two spray discharge openings 454.

As indicated above, the wand has both a spray discharge and a stream discharge, with the spray and stream discharge buttons being illustrated in FIGS. 28 through 34 and shown in their relationship to the above-described valve bodies in FIG. 7.

The stream actuator shown in FIGS. 28 through 31 includes a spool portion 460 which is located within cavity 442 shown in FIG. 13 and an exterior button portion 462. The button portion 462 has a cylindrical cavity 464 which contains the return spring 466 shown in FIG. 7. Operation of the stream button will return the wand to a stream discharge if the wand is in the spray discharge. The spring 466 normally retains the stream actuator in an outward position. The stream actuator forces water to flow through the stream flow path and shuts off flow through the spray flow path.

The spray actuator illustrated in FIGS. 33–35 is similar and has a spool 467 which is positioned within cavity 432 in FIG. 13. There is an exterior button 468 and a cavity 470 for location of a return spring 472. Both the spray actuator and the stream actuator have seal rings 474 and 478 for appropriate sealing of the cavities to prevent water from within the wand leaking to the outside. Seal ring 476 on the spray actuator prevents incoming unfiltered water from leaking prematurely into cavity 432.

The diaphragm 410 is important in having the wand assembly return to a stream position when the water is turned off or what may be termed a default position. The diaphragm 410 is illustrated in FIGS. 4, 5, 7, 36 and 37. It has a central portion 480 which is located within cavity 482 in the main body as shown in FIGS. 4, 5 and 13. When in the stream position, water flowing through passages 434 will create a force on the diaphragm which will cause the diaphragm to remain against the intermediate body passage 448. Because of the differential forces on the diaphragm, it will remain in this position until the spray button is operated.

When the spray button is depressed, its spool will cover passages 434, largely cutting off stream water such that the pressure differential across diaphragm 480 is reversed, thereby moving the diaphragm to close passages 434 and simultaneously uncover passage 448 so that water will then flow in the above-described paths to the spray discharge. Once this has taken place, again the differential forces on the diaphragm will hold it in a spray position until the stream button is operated or water is turned off.

Focusing on FIG. 7, the aerator for the stream discharge is indicated at 482, the spray former for the spray discharge is indicated at 484, and is shown in particular in FIGS. 39 through 42. There is an O-ring 486, a spray diffuser 488 and an O-ring 490 which complete the discharge portion of the main body assembly.

The spray former is cylindrical in nature with a flange 492 at one end and a series of peripherally arranged spray forming discharge ports 494 at the opposite end. The stream discharge will go through the center 496 of the spray former. The spray former has an annular cavity 498 which is in communication with the openings 494 and which will be in communication with the spray outlets 454 shown in FIG. 11.

The diaphragm 410, in addition to the movable central portion 480, has a series of openings which are in alignment with the above-described ports in the main body 408 and the intermediate body 404. The diaphragm portion 480 is inherently biased toward a position in which water flows to a stream discharge. Force created by water pressure will move the diaphragm 480 to a position causing water to flow in the above-described spray path, assuming the spray actuator button has been depressed. Once a button has been depressed to cause either a stream or a spray discharge, release of the button will retain the wand in the particular discharge position caused by operation of the button.

The front body 412, as shown in FIGS. 8, 9 and 10, contains the filtered water discharge. Filtered water will enter the front body 412 through a port 500; pass along passage 502, make a 90 degree turn to passage 504, make a further 90 degree turn into passage 506 and then down through the filtered water discharge port 508. This is assuming that the filtered water discharge button has been operated.

The filtered water actuator is shown in FIGS. 20 through 26. The filter actuator 510 has an unfiltered flow preventing portion 512 which cooperates with a face seal 514 to fit within front cavity 430 in the main body 408. Normally, water will flow through cavity 430 in passing to the stream or spray discharge. Although filtered water will flow through the main body outwardly through port 518 (FIG. 13) to the front body to reach passage 500, the presence of the filter actuator 510 within cavity 506 (FIGS. 4, 5) in the front body will prevent a filter water discharge. The filter actuator 510 has a filter button 520 with a cavity 522 to receive the end 524 of the filter actuator as particularly shown in FIG. 26. Movement of the button 520 will cause movement of the filter actuator to cause the blocking portion 512 and its related seal ring 514 to move into the cavity 430, preventing the flow of unfiltered water to the stream or spray discharge.

The filter discharge actuator assembly includes the described button 520 and the front body 412, as well as the actuator 510. A spring 530 fits within a cavity 532 in the button 520 and normally urges the button to the outward position shown in FIGS. 4 and 5. The spring is supported on a portion of the front body indicated at 534. Screws 536 will pass through openings 538 in the front body, main body and intermediate body and screw into the rear body, as particularly shown in FIG. 7.

The filter actuator 510 mounts four separate seals, as shown in FIGS. 4, 5 and 7, the seals being indicated at 514, 540, 542 and 546. Further, the actuator has a seal 542 which bears against a seat 550 in the front body interior, as shown in FIGS. 4 and 5, which normally closes the flow of filtered water through the front body. Only when the button 520 is operated, causing the filter actuator 510 to move away from the described seat, will water flow into passage 506 and then down through the filter discharge 508.

It should be understood that once the filter button has been depressed, the filter actuator will close off the flow of unfiltered stream and spray water through cavity 430 and that pressure applied to the front of unfiltered flow portion 512 will hold the filter actuator in the described position until water is turned off. At that time spring 530 will return the filter button and filter actuator to their normally closed position, as shown in FIGS. 4 and 5, permitting unfiltered water to flow in the previously described passage. Thus, the wand control valve assembly will return to the default stream position when water is turned off and this is the only way that the filter button can be returned to its at rest or default position shown in FIGS. 4 and 5.

The PCB assembly 200 will normally seat upon the top wand housing projection 28, with the PCB assembly being illustrated in detail in FIGS. 43 through 46. The circuit components which are shown physically on the PCB assembly 200 are illustrated in FIG. 83. FIGS. 78 through 82 illustrate a gasket 202 which fits over the PCB assembly 200 and has, molded integrally therewith, a stream boot 204 and a spray boot 206, as well as a filter water discharge boot 208. The boot, a single molded elastomeric seal element, will be positioned as shown in FIGS. 4 and 5, and will form a sealed cavity between projection 28 and upper housing 140 for the printed circuit board, and will have the button portions thereof accessible for user operation to actuate the button elements which are inside of and masked by the boots. In effect, the seal element comprises the visible exterior buttons for the user to operate with depression thereof, causing the buttons to move through the described operating positions.

Figure 84:
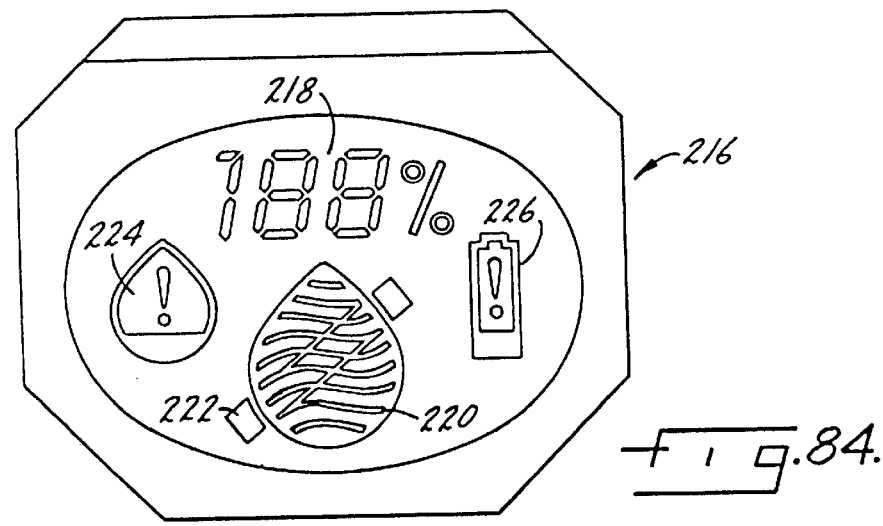
FIG. 84 is a plan view of the liquid crystal display.

The circuit associated with the filter discharge which is mounted on PCB assembly 200 includes a microcontroller 210 which has combined hardware and software to provide the following described functions. There is a lithium cell 212 which provides the battery power for the microcontroller. There is a quartz crystal 214 which is a timing device and provides uniform clock pulses to the microcontroller whenever there is a filtered water discharge. The microcontroller is connected to a liquid crystal display 216 which is shown in FIG. 84 with the various icons that will be displayed. The circuit of FIG. 83 further includes a piezo diaphragm 228 connected to a driver circuit 230 which will provide an audio indication to the user to correspond with certain visual displays. For example, filter life is shown by the percentage at the top of the display indicated at 218, in this case the display being 100 percent. Beneath the display of the actual percentage is a representation of a water drop indicated at 220, with a series of wavy lines thereacross, with the lines moving during the time there is a discharge of filtered water. There is also a slash bar 222 extending through the water drop 220, with the slash bar flashing when there is zero percent life remaining in the filter. At the left side of the display is a low water symbol 224 which will flash when filter life remaining is less than five percent. An audio indication will accompany this display. At the right side of the display is a low battery indicator 226 which will flash when the remaining life of the lithium cell 212 has reached an unacceptable level, indicating replacement is desirable. Again, this will be accompanied with an audio indication. The low filter life icon 224 and battery indicator will appear both when the filter is active and when it is inactive.

The circuit further includes filter cable selection jumpers indicated at 232 which are to accommodate the use of the wand with filters having different capacities. Thus, for a particular filter or for filters of a particular type the jumpers would be set in one position, whereas, if different life filters are used, the jumpers might be varied and their use is just to accommodate future variations in filter life. There is a filter activation switch 234 which is operated upon actuation of the filter button through a magnet 236 shown in FIG. 7. Closure of switch 234 causes pulses from timer 214 to be used by the microcontroller to determining remaining filter life. Finally, there are filter identification switches 238 which are responsive to the filter identification protrusions to be described hereinafter. Each filter will have a designated life and although all of the filters will be of the same physical size, the makeup of the carbon particles and related elements in the filter will provide filters with different capacity or different ratings. The identification of the particular filter is necessary so that the microcontroller can properly display the remaining life of the filter. The clock pulses from timer 214 provide the microcontroller with an indication of filter use, which with the known capacity of a particular filter provides the data for the microcontroller to calculate remaining filter life and provide a signal indicative thereof to the liquid crystal display 216.

The filter identification protrusions are indicated at 378 in FIG. 67. When the filter is installed, these protrusions will be in contact with the filter I.D. keypad indicated at 250 in FIGS. 48 and 49. The keypad is a silicon rubber element which is responsive to the particular protrusions on the filter cartridge and in turn will cause the contacts 252 and 254 of the keypad to be pushed into electrical and mechanical contact with the filter identification switch elements 238 on the printed circuit board. The filter I.D. keypad has a pressure sensitive adhesive backing so that this element can also function as a seal to prevent water from entering the electronic compartment.

To summarize operation of the wand assembly, there will be no passage of water into the assembly unless a filter cartridge is in proper position. For a cartridge to be removed, the upper and lower wand housings are separated and the cartridge may be removed. The flow control spool will move to its closed position, preventing the passage of water beyond the connector assembly. Once the wand has again been assembled with a cartridge in position, all of the electronics will be reset to a starting position and the identification of the filter will be supplied to the microcontroller as described.

When water is initially turned on there will be a stream discharge, as water will flow through the center of the filter directly to the wand valve control assembly and it will flow in a stream pattern, as this is the default position of the diaphragm between the intermediate body and the main body of the wand valve control assembly. At the same time as water is flowing to a stream discharge, water is also present in the chamber about the exterior of the carbon block filter and will be present in the filter and the wand valve control assembly. However, if the filter button is in the normally closed position, no filtered water will be discharged.

To change to a spray position from a stream position, the spray button is pressed, which causes movement of the spray actuator so that water will then flow through the above-described spray path rather than the stream path. Once the button has been depressed, it may be released and water will continue to flow in a spray pattern, as the diaphragm will have moved to a spray position and the pressure differential will retain it in such position. To return to a stream position, the stream button is pressed, causing movement of the stream actuator, in which case the diaphragm will move closing off the flow of water to the spray pathway. Again, a momentary depression of the button will cause the wand to return to the stream position.

When it is desired to have a filter discharge, the filter button is depressed, which will close off the flow of water in the stream and spray path and will open the path for filtered water to flow to the filtered water discharge. This discharge will continue until such time as water is turned off, as that is the only way to return the wand to its default stream position.

The readout which is powered by the described lithium battery will give visual indication to the user whenever the wand is in a filter position of the remaining life of the filter. This will be a percentage indication and will be accompanied by a visual movement of the wavy lines in the water drop icon when the filter is being used. At such time as the filter life reaches a five percent level, there will be both a flashing visual and an audio warning. This will occur both when the filter button is activated and deactivated. If battery life reaches an unacceptable level, there will also be an audio and flashing visual display when the filter is active and inactive. Thus, the filter display provides an indication of the remaining life of the filter, when the filter is completely used up, as well as when the battery should be changed.

Whereas the preferred form of the invention has been shown and described herein, it should be realized that there may be many modifications, substitutions and alterations thereto.

The embodiments of the invention in which an exclusive property or privilege is claimed are defined as follows:

1. A faucet having multiple water discharges including a housing, an input water connection for said housing, unfiltered water discharge means on said housing, filtered water discharge means on said housing, a water filter within said housing, valve control means in said housing connected to each of said water discharges, an unfiltered water flow path from said input water connection to said valve control means, manual means accessible from the exterior of said housing for operating said valve control means to direct water from said unfiltered water flow path to said unfiltered water discharge means, a filtered water flow path from said input water connection, through said filter, to said valve control means, filtered water manual control means accessible from the exterior of said housing for operating said valve control means to direct filtered water to said filtered water discharge means and not to said unfiltered water discharge means and an electrical circuit positioned within said housing, filtered water display means on said housing connected to said circuit, said circuit including means responsive to operation of said filtered water manual control means to cause said circuit to operate said display during discharge of filtered water.

2. The faucet of claim 1 in which said circuit includes a microcontroller, timing means connected to said microcontroller and providing timing signals thereto, and a switch connected to said microcontroller and responsive to the flow of water from said filtered water discharge means to cause said microcontroller to process said timing signals, said microcontroller being programmed to utilize said timing signals to provide an electrical signal to said display means indicative of filter condition.

3. The faucet of claim 2 wherein the electrical signal provided to said display means provides an indication of the remaining life of the filter.

4. The faucet of claim 2 wherein said microcontroller operates to provide a signal to said display means when said switch indicates there is a flow of water from said filter water discharge means.

5. The faucet of claim 2 wherein said electrical circuit includes a battery connected to said microcontroller for providing the power for operation thereof.

6. The faucet of claim 5 wherein said microcontroller is programmed to provide a visual display of a low battery condition.

7. The faucet of claim 2 wherein said circuit includes an audio indicator connected to said microcontroller and activated thereby.

8. The faucet of claim 7 wherein said circuit includes a battery, said microcontroller being programmed to provide an audio indication of a low battery condition.

9. The faucet of claim 1 wherein said display means includes indicia indicative of the remaining life of said filter.

10. The faucet of claim 9 wherein said display means includes indicia indicative that the filter is discharging filtered water.

11. The faucet of claim 10 wherein said display means includes continuously activated indicia indicative that remaining filter life is less than a predetermined minimum.

12. The faucet of claim 11 wherein said display means is a liquid crystal display under the control of said microcontroller.

13. The faucet of claim 1 wherein said circuit includes filter identification switch means, said filter having identification means thereon in electrical contact with said filter identification switch means, said microcontroller being programmed, in response to timing signals from said timing means, and in response to said filter identification switch means to provide a display indicative of the condition of said filter.

* * * * *